(12) United States Patent
Gupta et al.

(10) Patent No.: US 11,584,897 B2
(45) Date of Patent: Feb. 21, 2023

(54) LUBRICANT FORMULATIONS WITH SILICON-CONTAINING COMPOUNDS

(71) Applicant: Afton Chemical Corporation, Richmond, VA (US)

(72) Inventors: Ashutosh Gupta, Henrico, VA (US); Ian Bell, Abingdon (GB); Kongsheng Yang, Glen Allen, VA (US); Alexei Neverov, Chesterfield, VA (US); Joseph W. Roos, Mechanicsville, VA (US); Joseph Remias, Glen Allen, VA (US)

(73) Assignee: Afton Chemical Corporation, Richmond, VA (US)

( * ) Notice: Subject to any disclaimer, the term of this patent is extended or adjusted under 35 U.S.C. 154(b) by 0 days.

(21) Appl. No.: 17/159,891

(22) Filed: Jan. 27, 2021

(65) Prior Publication Data

US 2021/0230500 A1    Jul. 29, 2021

Related U.S. Application Data

(60) Provisional application No. 62/967,268, filed on Jan. 29, 2020.

(51) Int. Cl.
*C10M 169/04* (2006.01)
*C10M 125/26* (2006.01)
(Continued)

(52) U.S. Cl.
CPC ...... *C10M 169/044* (2013.01); *C10M 125/26* (2013.01); *C10M 135/10* (2013.01);
(Continued)

(58) Field of Classification Search
CPC ...... C10M 2207/028; C10M 2207/262; C10M 2219/046; C10M 2229/04; C10N 2030/40;
(Continued)

(56) References Cited

U.S. PATENT DOCUMENTS 4,282,107 A    8/1981  Zoleski et al.
7,285,516 B2  10/2007  Carrick et al.
(Continued)

FOREIGN PATENT DOCUMENTS

JP    H08-337788 A    12/1996
WO    2012106170 A1    8/2012
(Continued)

OTHER PUBLICATIONS

Gelest Inc. "Silicone Fluids: Stable, Inert Media" (2012): 1-31.
(Continued)

*Primary Examiner* — Vishal V Vasisth
(74) *Attorney, Agent, or Firm* — Mendelsohn Dunleavy, P.C.

(57) ABSTRACT

A lubricating oil composition including a major amount of a base oil, one or more calcium-containing detergents to provide at least 1000 ppmw of calcium, and one or more silicon-containing compound(s) to provide at least 50 ppmw of silicon to the lubricating oil composition, all based on the total weight of the lubricating oil composition, wherein a ratio of ppmw of silicon provided by the one or more silicon-containing compound(s) to the lubricating oil composition to the ppmw of calcium provided by the one or more calcium-containing detergent(s) to the lubricating oil composition is from 0.02 to 1. Methods of using these compositions and silicon-containing detergents are also described.

10 Claims, 1 Drawing Sheet

(51) Int. Cl.
*C10M 135/10* (2006.01)
*C10M 139/04* (2006.01)
*C10M 141/08* (2006.01)
*C10M 141/12* (2006.01)
*C10M 155/02* (2006.01)
*C10M 161/00* (2006.01)
*C10M 169/00* (2006.01)
*C10N 30/00* (2006.01)
*C10N 40/25* (2006.01)
*C10N 20/06* (2006.01)
*C10N 30/04* (2006.01)

(52) U.S. Cl.
CPC ........ *C10M 139/04* (2013.01); *C10M 141/08* (2013.01); *C10M 141/12* (2013.01); *C10M 155/02* (2013.01); *C10M 161/00* (2013.01); *C10M 169/00* (2013.01); C10M 2201/105 (2013.01); C10M 2203/003 (2013.01); C10M 2219/046 (2013.01); C10M 2227/04 (2013.01); C10M 2229/041 (2013.01); C10N 2020/06 (2013.01); C10N 2030/04 (2013.01); C10N 2030/40 (2020.05); C10N 2040/255 (2020.05)

(58) Field of Classification Search
CPC ............ C10N 2030/12; C10N 2020/06; C10N 2010/02; C10N 2030/04; C10N 2040/255
See application file for complete search history.

(56) References Cited

U.S. PATENT DOCUMENTS

| | | |
|---|---|---|
| 2007/0244016 A1 | 10/2007 | Buck et al. |
| 2012/0032543 A1* | 2/2012 | Chakraborty ........ C10M 125/02 |
| | | 310/90 |
| 2012/0108476 A1 | 5/2012 | Morcos et al. |
| 2015/0322367 A1 | 11/2015 | Patel et al. |
| 2018/0237718 A1 | 8/2018 | Stiddler et al. |
| 2019/0360383 A1 | 11/2019 | Miller |

FOREIGN PATENT DOCUMENTS

| | | |
|---|---|---|
| WO | 2018074522 A1 | 4/2018 |
| WO | 2018136138 A1 | 7/2018 |

OTHER PUBLICATIONS

Colas, Andre, et al. "Silicones in Pharmaceutical Applications. Part 5: Siliconization of Parenteral Packaging Components." Dow Corning Corporation (2006): 4 pages.

Extended European Search Report for corresponding European application No. 21154149.5; dated Jun. 24, 2021 (7 pages).

* cited by examiner

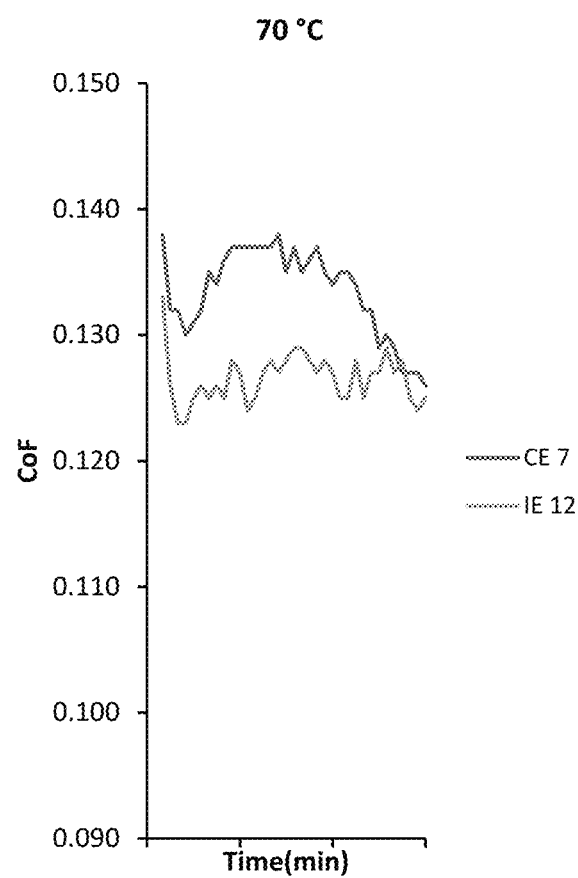

LUBRICANT FORMULATIONS WITH SILICON-CONTAINING COMPOUNDS

This application claims benefit of 62/967,268 filed Jan. 29, 2020.

TECHNICAL FIELD

The disclosure relates to lubricating oil compositions for improving low speed pre-ignition (LSPI) performance in turbocharged gasoline direct-injection engines. More specifically, the disclosure relates to a lubricating oil composition comprising an additive composition prepared by mixing one or more of a calcium-containing detergent and a silicon-containing compound, and methods for improving low speed pre-ignition (LSPI) performance in turbocharged gasoline direct-injection engines by lubricating the engine with the lubricating oil compositions disclosed herein.

BACKGROUND

Turbocharged or supercharged engines (i.e. boosted internal combustion engines) may exhibit an abnormal combustion phenomenon known as stochastic pre-ignition or low speed pre-ignition (or "LSPI"). LSPI is a pre-ignition event that may include very high-pressure spikes, early combustion during an inappropriate crank angle, and knock. All of these, individually and in combination, have the potential to cause degradation and/or severe damage to the engine. However, because LSPI events occur only sporadically and in an uncontrolled fashion, it is difficult to identify the causes for this phenomenon and to develop solutions to suppress it.

Pre-ignition is a form of combustion that results from ignition of the air-fuel mixture in the combustion chamber prior to the desired ignition of the air-fuel mixture by the igniter. Pre-ignition has typically been a problem during high speed engine operation since heat from operation of the engine may heat a part of the combustion chamber to a sufficient temperature to ignite the air-fuel mixture upon contact. This type of pre-ignition is sometimes referred to as hot-spot pre-ignition.

More recently, intermittent abnormal combustion has been observed in boosted internal combustion engines at low speeds and medium-to-high loads. For example, during operation of the engine at 3,000 rpm or less, under load, with a brake mean effective pressure (BMEP) of at least 10 bar, low speed pre-ignition may occur in a random and stochastic fashion. During low speed engine operation, the compression stroke time is longest.

Several published studies have demonstrated that turbocharger use, engine design, engine coatings, piston shape, fuel choice, and/or engine oil additives may contribute to an increase in LSPI events. One theory suggests that autoignition of engine oil droplets that enter the engine combustion chamber from the piston crevice (the space between the piston ring pack and cylinder liner) may be one cause of LSPI events. Accordingly, there is a need for engine oil additive components and/or combinations that are effective to reduce or eliminate LSPI in boosted internal combustion engines.

Some studies are exploring the options of lowering calcium sulfonate detergent concentrations to help suppress LSPI, however this reduction adversely affects the performance of the lubricating oil in other areas, such as corrosion (e.g., rust) protection. Magnesium sulfonates have also been evaluated as an alternative to calcium sulfonate detergents to provide corrosion protection while improving LSPI performance. Unfortunately, this may also lead to debits in performance in other areas such as fuel economy.

US 2018/0237718 relates to lubricating oil compositions for improving low speed pre-ignition in direct injection spark-ignited internal combustion engines. The lubricating oil compositions include a detergent comprising an overbased calcium detergent having a total base number of at least 150. The lubricating oil composition has a calcium content of at least 0.08 wt. % and a silicon content of at least 12 ppmw of by weight, based on the total weight of the lubricating oil composition.

US 2019/0360383 relates to lubricating oil compositions for improving low speed pre-ignition in direct injection spark-ignited internal combustion engines. The lubricating oil compositions may include a detergent in combination with at least one silane-containing compound, The present disclosure is directed to providing particular lubricating oil compositions and methods of using such lubricating oil compositions which result in a significant benefit in reduction of LSPI events, while still providing other desirable properties that are important for lubrication of direct injection spark-ignited internal composition engines.

SUMMARY AND TERMS

The disclosure relates to a lubricating oil composition including greater than 50 wt. % of a base oil of lubricating viscosity, and an additive composition prepared by mixing a calcium-containing detergent, and a silicon-containing compound.

The following sentences describe some embodiments of the invention.

1. In a first aspect, the present invention relates to a lubricating oil composition comprising:

greater than 50 wt. % of a base oil of lubricating viscosity, based on a total weight of the lubricating oil composition, and an additive composition prepared by mixing:

a) an amount of one or more calcium-containing detergents to provide at least 1000 ppmw of calcium to the lubricating oil composition, and b) an amount of one or more silicon-containing compound(s) to provide at least 50 ppmw of silicon to the lubricating oil composition, based on the total weight of the lubricating oil composition, said one or more silicon-containing compound(s) being selected from the group consisting of:

i) siloxanes according to Formula (I):

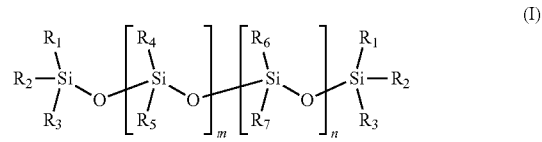

wherein $R_1$, $R_2$, $R_3$, are each independently selected from an alkyl group comprising from 1 to 20 carbon atoms, $R_4$ and $R_6$ are each independently selected from an alkyl group comprising from 1 to 20 carbon atoms and an aryl group comprising from 6 to 16 carbon atoms, $R_5$ and $R_7$ are each independently selected from an alkyl group comprising from 1 to 3 carbon atoms, m is a number from 0 to 50, n is a number from 0 to 50, and m+n<50; and ii) silane compounds according to Formula (II);

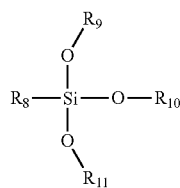

wherein $R_8$ is an alkyl group comprising from 2 to 20 carbon atoms, and $R_9$, $R_{10}$, and $R_{11}$ are each independently selected from an alkyl group comprising from 1 to 3 carbon atoms; and iii) silica and/or silicon-containing nanoparticles, wherein the nanoparticles have a size of from 1 to 500 nm, as measured by Dynamic Light Scattering;

wherein a ratio of ppmw of silicon provided by the one or more silicon-containing compound(s) to the lubricating oil composition to the ppmw of calcium provided by the one or more calcium-containing detergent(s) to the lubricating oil composition is from 0.02 to 1.

2. The lubricating oil composition of sentence 1, wherein the silicon-containing compound may be a compound according to Formula (I).

3. The lubricating oil composition of sentence 2, wherein $R_1$, $R_2$ and $R_3$ may be methyl groups, n=0, and m is from 1 to less than 50.

4. The lubricating oil composition of sentence 2, wherein $R_4$ and $R_5$ may be methyl groups, n=0, and m is from 1 to less than 50.

5. The lubricating oil composition of sentence 2, wherein $R_1$, $R_2$, $R_3$, $R_4$, and $R_5$ may be methyl groups.

6. The lubricating oil composition of sentence 2, wherein n may be from 1 to 23, m may be from 1 to 27, $R_1$, $R_2$, $R_3$, $R_4$, $R_5$, and $R_7$ may be each independently selected from an alkyl group comprising from 1 to 3 carbon atoms, and $R_6$ may be selected from an alkyl group comprising from 1 to 20 carbon atoms.

7. The lubricating oil composition of sentence 2, wherein the compound of the Formula (I) may be selected from the group consisting of a polydimethylsiloxane, hexadecylmethylsiloxane-dimethylsiloxane copolymer, 3-ethylheptamethyltrisiloxane, octamethyltrisiloxane, decamethyltetrasiloxane, dodecamethylpentasiloxane, and tetradecamethylhexasiloxane.

8. The lubricating oil composition of sentence 2, wherein the compound of the Formula (I) may have a number average molecular weight of from 100 g/mol to 1,000 g/mol, or from 125 g/mol to 800 g/mol, or from 150 g/mol to 600 g/mol, as determined by gel permeation chromatography.

9. The lubricating oil composition of sentence 2, wherein the compound of the Formula (I) may have a number average molecular weight of at least 1,000 g/mol, or from 1,000 g/mol to 5,000 g/mol, or from 1,000 g/mol to less than 3866 g/mol, as determined by gel permeation chromatography.

10. The lubricating oil composition of sentence 2, wherein the compound of the Formula (I) may have a kinematic viscosity of from 1 cSt to 299 cSt, or from 1 to 50 cSt, or from 1 to 30 cSt, or from 1 to 10 cSt, or from 1 to less than 10 cSt, at 25° C., as measured according to ASTM-445-19

11. The lubricating oil composition of sentence 2, wherein the compound of Formula (I) may have an elemental ratio of hydrogen atoms to silicon atoms of from 6.115 to 9.

12. The lubricating oil composition of sentence 2, wherein the compound of Formula (I) may have an elemental ratio of carbon atoms to silicon atoms of from 2.038 to 3.

13. The lubricating oil composition of sentence 2, wherein the compound of Formula (I) may have an elemental ratio of silicon atoms to oxygen atoms of from 1.019 to 2.

14. The lubricating oil composition of sentence 1, wherein the silicon-containing compound may be a compound according to Formula (II).

15. The lubricating oil composition of sentence 14, wherein the $R_8$ may be an alkyl group comprising from 11 to 18 carbon atoms.

16. The lubricating oil composition of sentence 14, wherein $R_9$, $R_{10}$, and $R_{11}$ may be each independently selected from an alkyl group comprising 1 to 2 carbon atoms.

17. The lubricating oil composition of sentence 14, wherein the compound according to Formula (II) may have a number average molecular weight of 100 to 400 g/mol, as determined by gel permeation chromatography.

18. The lubricating oil composition of sentence 14, wherein Formula (II) may be selected from hexadecyltrimethoxysilane, undecyltriethoxysilane, and tetradecyltriethoxysilane, or more preferably, hexadecyltrimethoxysilane.

19. The lubricating oil composition of sentence 1, wherein the silicon-containing compound may be a silica and/or silicon-containing nanoparticle.

20. The lubricating oil composition of sentence 19, wherein the silica and/or silicon-containing nanoparticles are optionally solubilized and/or functionalized.

21. The lubricating oil composition of sentence 19, wherein the silicon-containing nanoparticles may be silicon dioxide.

22. The lubricating oil composition of any one of sentences 1-21, wherein the ratio of the ppmw of silicon provided by the one or more silicon-containing compound(s) to the lubricating oil composition to the ppmw of calcium provided by the one or more calcium-containing detergent(s) to the lubricating oil composition may be from 0.027 to 0.75, or from 0.035 to 0.5, or from 0.0375 to 0.45.

23. The lubricating oil composition of any one of sentences 1-22, wherein the calcium-containing detergent may be a calcium sulfonate detergent.

24. The lubricating oil composition of any one of sentences 1-23, wherein the calcium-containing detergent may be present in an amount sufficient to provide from 1100 ppmw to 4000 ppmw of calcium, or from about 1200 ppmw to about 3500 ppmw of calcium, or from about 1800 ppmw to about 2500 ppmw of calcium, based on the total weight of the lubricating oil composition.

25. The lubricating oil composition of any one of sentences 1-24, wherein the calcium-containing detergent may be present in an amount to provide 1.0 wt % to about 10 wt %, or about 1.0 wt % to about 8 wt %, or about 1.0 wt % to about 4.0 wt %, or greater than about 4 wt % to about 8 wt %, based on the total weight of the lubricating oil composition.

26. The lubricating oil composition of any one of sentences 1-25, wherein the one or more calcium-containing detergents may be an overbased calcium-containing detergent having a TBN of greater than 225 mg KOH/g, or greater than 250 mg KOH/g, or greater than 275 mg KOH/g, or at least 300 mg KOH/g, as measured by ASTM-2896.

27. The lubricating oil composition of any one of sentences 1-26, wherein the lubricating oil composition may be devoid of detergents selected from the group consisting of phenate-containing detergents and calcium salicylate detergents.

28. The lubricating oil composition of any one of sentences 1-27, wherein the silicon-containing compound may be present in an amount sufficient to provide from 50 ppm to about 2000 ppm of silicon, or from about 60 ppm to about 1500 ppm of silicon, or from about 70 ppm to about 1000 ppm of silicon, or from about 150 ppm to about 700 ppm of silicon, or from about 170 ppm to about 550 ppm of silicon, based on the total weight of the lubricating oil composition.

29. The lubricating oil composition of any one of sentences 1-28, wherein the lubricating oil composition provides acceptable stability.

30. The lubricating oil composition of any one of sentences 1-29, wherein the lubricating oil composition provides corrosion protection, according to ASTM D6557.

31. The lubricating oil composition of any one of sentences 1-30, wherein the lubricating oil composition may have a total sulfated ash content of 2 wt % or less, or about 1.5 wt % or less, or about 1.1 wt % or less, or about 1 wt % or less, or about 0.8 wt % or less, or about 0.5 wt % or less, based on the total weight of the lubricating oil composition.

32. The lubricating oil composition of any one of sentences 1-31, wherein the lubricating oil composition may be effective to reduce the number of low-speed pre-ignition events relative to the number of low-speed pre-ignition events in the same engine lubricated with the same lubricating oil composition absent the additive composition, as determined in a GM 2.0 Liter, 4 cylinder Ecotec turbocharged gasoline direct injection engine operated at an engine speed of 2,000 rpm and a brake mean effective pressure (BMEP) of about 18 bar for 6 segments of 25,000 cycles per segment.

33. In a second aspect, the present invention relates to a method for reducing low-speed pre-ignition (LSPI) events in a turbocharged gasoline direct-injection engine comprising lubricating the engine with the lubricating oil composition of any one of sentences 1-32.

34. The method of sentence 33, wherein the number of low-speed pre-ignition (LSPI) events may be reduced relative to a number of low speed pre-ignition events in the same engine lubricated with the same lubricating oil composition absent the additive composition.

35. In a third aspect, the present invention relates to a method for providing corrosion protection, comprising lubricating an engine with the lubricating oil composition of any one of sentences 1-32.

36. In a fourth aspect, the present invention relates to a method of preparing a silicon-containing detergent comprising the steps of:
    mixing a) and b) to form a mixture:
        a) one or more calcium-containing detergent(s); and
        b) one or more silicon-containing compound(s) selected from the group consisting of:
            i) siloxanes according to the Formula (I):

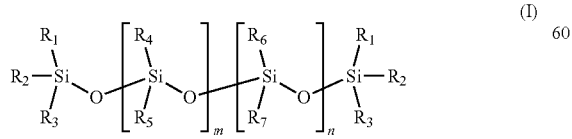

(I)

wherein $R_1$, $R_2$, $R_3$, are each independently selected from an alkyl group comprising from 1 to 20 carbon atoms, $R_4$ and $R_6$ are each independently selected from an alkyl group comprising from 1 to 20 carbon atoms and an aryl group comprising from 6 to 16 carbon atoms, $R_5$ and $R_7$ are each independently selected from an alkyl group comprising from 1 to 3 carbon atoms, m is a number from 0 to 50, n is a number from 0 to 50, and m+n<50;

ii) silicon-containing compounds according to Formula (III)

(III)

wherein $R_{12}$, $R_{13}$, $R_{14}$, and $R_{15}$ are each independently selected from an alkyl group comprising from 1 to 20 carbon atoms and an alkoxy group comprising from 1 to 20 carbon atoms; and iii) silica and/or silicon-containing nanoparticles, wherein the nanoparticles have a size of from 1 to 500 nm, as measured by Dynamic Light Scattering;

wherein a ratio of ppmw of silicon provided by the one or more silicon-containing compound(s) to the silicon-containing detergent to the ppmw of calcium provided by the one or more calcium-containing detergent(s) to the silicon-containing detergent is from 0.02 to 1; and heating the mixture to a temperature of from about 30° C. to about 90° C.

37. The method of sentence 36, may further comprise c) a step of filtering the mixture after the step of heating.

38. The method of any one of sentences 36 to 37, wherein the heating step may be carried out at a temperature of from about 35° C. to about 80° C., or from about 40° C. to about 70° C., or from about 45° C. to about 65° C. for a period of 30 minutes to 10 hours, or from 1 hour to 8 hours.

39. The method of any one of sentences 36 to 38, wherein the silicon-containing compound may be a compound according to Formula (I).

40. The method of any one of sentences 36 to 38, wherein the silicon-containing compound may be a compound according to Formula (III).

41. The method of any one of sentences 36 to 38, wherein the silicon-containing compound may be a silica and/or silicon-containing nanoparticle.

42. In a fifth aspect, the present invention relates to a silicon containing-detergent prepared by mixing:
    a) one or more calcium-containing detergent(s); and
    b) one or more silicon-containing compound(s) selected from the group consisting of:
        i) siloxanes according to the Formula (I):

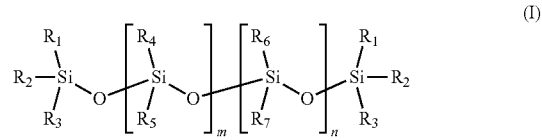

(I)

wherein $R_1$, $R_2$, $R_3$, are each independently selected from an alkyl group comprising from 1 to 20 carbon atoms, $R_4$ and $R_6$ are each independently selected from an alkyl group comprising from 1 to 20 carbon atoms and an aryl group comprising from 6 to 16 carbon atoms, $R_5$ and $R_7$ are each independently selected from an alkyl group comprising from 1 to 3 carbon atoms, m is an integer from 0 to 50, n is an integer from 0 to 50, and m+n<50;
  ii) silicon-containing compounds according to Formula (III):

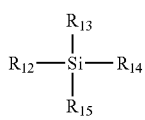

wherein $R_{12}$, $R_{13}$, $R_{14}$, and $R_{15}$ are each independently selected from an alkyl group comprising from 1 to 20 carbon atoms and an alkoxy group comprising from 1 to 20 carbon atoms; and
  iii) silica and/or silicon-containing nanoparticles, wherein the nanoparticles have a size of from 1 to 500 nm, as measured by Dynamic Light Scattering;
wherein a ratio of ppmw of silicon provided by the one or more silicon-containing compound(s) to the silicon-containing detergent to the ppmw of calcium provided by the one or more calcium-containing detergent(s) to the silicon-containing detergent is from 0.02 to 1.

43. In a sixth aspect, the present invention relates to a silicon containing-detergent prepared by the reaction of:
  a) one or more calcium-containing detergent(s); and
  b) one or more silicon-containing compound(s) selected from the group consisting of:
  i) siloxanes according to the Formula (I):

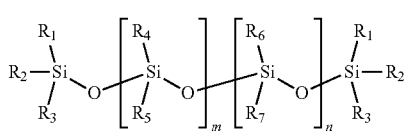

wherein $R_1$, $R_2$, $R_3$, are each independently selected from an alkyl group comprising from 1 to 20 carbon atoms, $R_4$ and $R_6$ are each independently selected from an alkyl group comprising from 1 to 20 carbon atoms and an aryl group comprising from 6 to 16 carbon atoms, $R_5$ and $R_7$ are each independently selected from an alkyl group comprising from 1 to 3 carbon atoms, m is an integer of from 0 to 50, n is integer of from 0 to 50, and m+n<50;
  ii) silicon-containing compounds according to Formula (III):

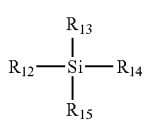

wherein $R_{12}$, $R_{13}$, $R_{14}$, and $R_{15}$ are each independently selected from an alkyl group comprising from 1 to 20 carbon atoms and an alkoxy group comprising from 1 to 20 carbon atoms; and
  iii) silica and/or silicon-containing nanoparticles, wherein the nanoparticles have a size of from 1 to 500 nm, as measured by Dynamic Light Scattering;
wherein a ratio of ppmw of silicon provided by the one or more silicon-containing compound(s) to the silicon-containing detergent to the ppmw of calcium provided by the one or more calcium-containing detergent(s) to the silicon-containing detergent is from 0.02 to 1.

44. In a seventh aspect, the present invention relates to a lubricating oil composition comprising:
  greater than 50 wt. % of a base oil of lubricating viscosity, based on a total weight of the lubricating oil composition, and an amount of one or more silicon-containing detergents as claimed in any one of sentences 42-43, wherein the one or more silicon-containing detergents is present in an amount to provide at least 50 ppmw of silicon, based on the total weight of the lubricating oil composition.

45. In an eighth aspect, the present invention relates to a method for reducing low-speed pre-ignition (LSPI) events in a turbocharged gasoline direct-injection engine comprising lubricating the engine with the lubricating oil composition of sentence 44, wherein the number of low-speed pre-ignition (LSPI) events is reduced relative to a number of low speed pre-ignition events in the same engine lubricated with the same lubricating oil composition absent the one or more silicon-containing detergents.

46. In a ninth aspect, the present invention relates to a method for providing corrosion protection, comprising lubricating an engine with the lubricating oil composition of sentence 44.

The following definitions of terms are provided in order to clarify the meanings of certain terms as used herein.

The terms "oil composition," "lubrication composition," "lubricating oil composition," "lubricating oil," "lubricant composition," "lubricating composition," "fully formulated lubricant composition," "lubricant," "crankcase oil," "crankcase lubricant," "engine oil," "engine lubricant," "motor oil," and "motor lubricant" are considered synonymous, fully interchangeable terminology referring to the finished lubrication product comprising a major amount of a base oil plus a minor amount of an additive composition.

As used herein, the terms "additive package," "additive concentrate," "additive composition," "engine oil additive package," "engine oil additive concentrate," "crankcase additive package," "crankcase additive concentrate," "motor oil additive package," "motor oil concentrate," are considered synonymous, fully interchangeable terminology referring the portion of the lubricating oil composition excluding the major amount of base oil stock mixture. The additive package may or may not include the viscosity index improver or pour point depressant.

The term "overbased" relates to metal salts, such as metal salts of sulfonates, carboxylates, salicylates, and/or phenates, wherein the amount of metal present exceeds the stoichiometric amount. Such salts may have a conversion level in excess of 100% (i.e., they may comprise more than 100% of the theoretical amount of metal needed to convert the acid to its "normal," "neutral" salt). The expression "metal ratio," often abbreviated as MR, is used to designate the ratio of total chemical equivalents of metal in the overbased salt to chemical equivalents of the metal in a neutral salt according to known chemical reactivity and stoichiometry. In a normal or neutral salt, the metal ratio is one and in an overbased salt, MR, is greater than one. They are commonly referred to as overbased, hyperbased, or superbased salts and may be salts of organic sulfur acids, carboxylic acids, salicylates, and/or phenols. In the present disclosure, the overbased detergent has a TBN of greater than 225 mg KOH/g. The overbased detergent may be a combination of two or more overbased detergents each having a TBN of greater than 225 mg KOH/g, as measured by the method of ASTM D2896.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having a predominantly hydrocarbon character. Each hydrocarbyl group is independently selected from hydrocarbon substituents, and substituted hydrocarbon substituents containing one or more of halo groups, hydroxyl groups, alkoxy groups, mercapto groups, nitro groups, nitroso groups, amino groups, pyridyl groups, furyl groups, imidazolyl groups, oxygen and nitrogen, and wherein no more than two non-hydrocarbon substituents are present for every ten carbon atoms in the hydrocarbyl group.

As used herein, the term "hydrocarbylene substituent" or "hydrocarbylene group" is used in its ordinary sense, which is well-known to those skilled in the art. Specifically, it refers to a group that is directly attached at two locations of the molecule to the remainder of the molecule by a carbon atom and having predominantly hydrocarbon character. Each hydrocarbylene group is independently selected from divalent hydrocarbon substituents, and substituted divalent hydrocarbon substituents containing halo groups, alkyl groups, aryl groups, alkylaryl groups, arylalkyl groups, hydroxyl groups, alkoxy groups, mercapto groups, nitro groups, nitroso groups, amino groups, pyridyl groups, furyl groups, imidazolyl groups, oxygen and nitrogen, and wherein no more than two non-hydrocarbon substituents is present for every ten carbon atoms in the hydrocarbylene group.

As used herein, the term "percent by weight", unless expressly stated otherwise, means the percentage the recited component represents to the weight of the entire composition.

The terms "soluble," "oil-soluble," or "dispersible" used herein may, but does not necessarily, indicate that the compounds or additives are soluble, dissolvable, miscible, or capable of being suspended in the oil in all proportions. The foregoing terms do mean, however, that they are, for instance, soluble, suspendable, dissolvable, or stably dispersible in oil to an extent sufficient to exert their intended effect in the environment in which the oil is employed. Moreover, the additional incorporation of other additives may also permit incorporation of higher levels of a particular additive, if desired.

The term "TBN" as employed herein is used to denote the Total Base Number in mg KOH/g as measured by the method of ASTM D2896.

The term "alkyl" as employed herein refers to straight, branched, cyclic, and/or substituted saturated chain moieties of from about 1 to about 100 carbon atoms.

The term "alkenyl" as employed herein refers to straight, branched, cyclic, and/or substituted unsaturated chain moieties of from about 3 to about 10 carbon atoms.

The term "aryl" as employed herein refers to single and multi-ring aromatic compounds that may include alkyl, alkenyl, alkylaryl, amino, hydroxyl, alkoxy, halo substituents, and/or heteroatoms including, but not limited to, nitrogen, oxygen, and sulfur.

Lubricants, combinations of components, or individual components of the present description may be suitable for use in various types of internal combustion engines. Suitable engine types may include, but are not limited to heavy duty diesel, passenger car, light duty diesel, medium speed diesel, or marine engines. An internal combustion engine may be a diesel fueled engine, a gasoline fueled engine, a natural gas fueled engine, a bio-fueled engine, a mixed diesel/biofuel fueled engine, a mixed gasoline/biofuel fueled engine, an alcohol fueled engine, a mixed gasoline/alcohol fueled engine, a compressed natural gas (CNG) fueled engine, or mixtures thereof. A diesel engine may be a compression ignited engine. A gasoline engine may be a spark-ignited engine. An internal combustion engine may also be used in combination with an electrical or battery source of power. An engine so configured is commonly known as a hybrid engine. The internal combustion engine may be a 2-stroke, 4-stroke, or rotary engine. Suitable internal combustion engines include marine diesel engines (such as inland marine), aviation piston engines, low-load diesel engines, and motorcycle, automobile, locomotive, and truck engines.

The internal combustion engine may contain components of one or more of an aluminum-alloy, lead, tin, copper, cast iron, magnesium, ceramics, stainless steel, composites, and/or mixtures thereof. The components may be coated, for example, with a diamond-like carbon coating, a lubrited coating, a phosphorus-containing coating, molybdenum-containing coating, a graphite coating, a nano-particle-containing coating, and/or mixtures thereof. The aluminum-alloy may include aluminum silicates, aluminum oxides, or other ceramic materials. In one embodiment the aluminum-alloy is an aluminum-silicate surface. As used herein, the term "aluminum alloy" is intended to be synonymous with "aluminum composite" and to describe a component or surface comprising aluminum and another component intermixed or reacted on a microscopic or nearly microscopic level, regardless of the detailed structure thereof. This would include any conventional alloys with metals other than aluminum as well as composite or alloy-like structures with non-metallic elements or compounds such with ceramic-like materials.

The lubricating oil composition for an internal combustion engine may be suitable for any engine lubricant irrespective of the sulfur, phosphorus, or sulfated ash (ASTM D-874) content. The sulfur content of the engine oil lubricant may be about 1 wt % or less, or about 0.8 wt % or less, or about 0.5 wt % or less, or about 0.4 wt % or less, or about 0.3 wt % or less, or about 0.2 wt % or less. In one embodiment the sulfur content may be in the range of about 0.001 wt % to about 0.5 wt %, or about 0.01 wt % to about 0.3 wt %. The phosphorus content may be about 0.2 wt % or less, or about 0.1 wt % or less, or about 0.085 wt % or less, or about 0.08 wt % or less, or even about 0.06 wt % or less, about 0.055 wt % or less, or about 0.05 wt % or less. In one embodiment the phosphorus content may be about 50 ppmw to about 1000 ppmw, or about 325 ppmw to about 850 ppmw. The total sulfated ash content may be about 2 wt % or less, or about 1.5 wt % or less, or about 1.1 wt % or less, or about 1 wt % or less, or about 0.8 wt % or less, or about 0.5 wt % or less. In one embodiment the sulfated ash content may be about 0.05 wt % to about 0.9 wt %, or about 0.1 wt % or about 0.2 wt % to about 0.45 wt %. In another embodiment, the sulfur content may be about 0.4 wt % or less, the phosphorus content may be about 0.08 wt % or less, and the sulfated ash is about 1 wt % or less. In yet another embodiment the sulfur content may be about 0.3 wt % or less, the phosphorus content is about 0.05 wt % or less, and the sulfated ash may be about 0.8 wt % or less.

In one embodiment the lubricating oil composition is an engine oil, wherein the lubricating oil composition may have (i) a sulfur content of about 0.5 wt % or less, (ii) a phosphorus content of about 0.1 wt % or less, and (iii) a sulfated ash content of about 1.5 wt % or less.

In some embodiments, the lubricating oil composition is suitable for use with engines powered by low sulfur fuels, such as fuels containing about 1 to about 5% sulfur. Highway vehicle fuels contain about 15 ppmw sulfur (or about 0.0015% sulfur). The lubricating oil composition is suitable for use with boosted internal combustion engines including turbocharged or supercharged internal combustion engines.

Further, lubricants of the present description may be suitable to meet one or more industry specification requirements such as ILSAC GF-3, GF-4, GF-5, GF-6, PC-11, CF, CF-4, CH-4, CK-4, FA-4, CJ-4, CI-4 Plus, CI-4, API SG, SJ, SL, SM, SN, ACEA A1/B1, A2/B2, A3/B3, A3/B4, A5/B5, C1, C2, C3, C4, C5, E4/E6/E7/E9, Euro 5/6, JASO DL-1, Low SAPS, Mid SAPS, or original equipment manufacturer specifications such as Dexos™ 1, Dexos™ 2, MB-Approval 229.1, 229.3, 229.5, 229.51/229.31, 229.52, 229.6, 229.71, 226.5, 226.51, 228.0/.1, 228.2/.3, 228.31, 228.5, 228.51, 228.61, VW 501.01, 502.00, 503.00/503.01, 504.00, 505.00, 505.01, 506.00/506.01, 507.00, 508.00, 509.00, 508.88, 509.99, BMW Longlife-01, Longlife-01 FE, Longlife-04, Longlife-12 FE, Longlife-14 FE+, Longlife-17 FE+, Porsche A40, C30, Peugeot Citroen Automobiles B71 2290, B71 2294, B71 2295, B71 2296, B71 2297, B71 2300, B71 2302, B71 2312, B71 2007, B71 2008, Renault RN0700, RN0710, RN0720, Ford WSS-M2C153-H, WSS-M2C930-A, WSS-M2C945-A, WSS-M2C913A, WSS-M2C913-B, WSS-M2C913-C, WSS-M2C913-D, WSS-M2C948-B, WSS-M2C948-A, GM 6094-M, Chrysler MS-6395, Fiat 9.55535 G1, G2, M2, N1, N2, Z2, S1, S2, S3, S4, T2, DS1, DSX, GH2, GS1, GSX, CR1, Jaguar Land Rover STJLR.03.5003, STJLR.03.5004, STJLR.03.5005, STJLR.03.5006, STJLR.03.5007, STJLR.51.5122 or any past or future PCMO or HDD specifications not mentioned herein. In some embodiments for passenger car motor oil (PCMO) applications, the amount of phosphorus in the finished fluid is 1000 ppmw or less or 900 ppmw or less or 800 ppmw or less.

Other hardware may not be suitable for use with the disclosed lubricant. A "functional fluid" is a term which encompasses a variety of fluids including but not limited to tractor hydraulic fluids, power transmission fluids including automatic transmission fluids, continuously variable transmission fluids and manual transmission fluids, hydraulic fluids, including tractor hydraulic fluids, some gear oils, power steering fluids, fluids used in wind turbines, compressors, some industrial fluids, and fluids related to power train components. It should be noted that within each of these fluids such as, for example, automatic transmission fluids, there are a variety of different types of fluids due to the various transmissions having different designs which have led to the need for fluids of markedly different functional characteristics. This is contrasted by the term "lubricating fluid" which is not used to generate or transfer power.

With respect to tractor hydraulic fluids, for example, these fluids are all-purpose products used for all lubricant applications in a tractor except for lubricating the engine. These lubricating applications may include lubrication of gearboxes, power take-off and clutch(es), rear axles, reduction gears, wet brakes, and hydraulic accessories.

When the functional fluid is an automatic transmission fluid, the automatic transmission fluids must have enough friction for the clutch plates to transfer power. However, the friction coefficient of fluids has a tendency to decline due to the temperature effects as the fluid heats up during operation. It is important that the tractor hydraulic fluid or automatic transmission fluid maintain its high friction coefficient at elevated temperatures, otherwise brake systems or automatic transmissions may fail. This is not a function of an engine oil.

Tractor fluids, and for example Super Tractor Universal Oils (STUOs) or Universal Tractor Transmission Oils (UTTOs), may combine the performance of engine oils with transmissions, differentials, final-drive planetary gears, wet-brakes, and hydraulic performance. While many of the additives used to formulate a UTTO or a STUO fluid are similar in functionality, they may have deleterious effect if not incorporated properly. For example, some anti-wear and extreme pressure additives used in engine oils can be extremely corrosive to the copper components in hydraulic pumps. Detergents and dispersants used for gasoline or diesel engine performance may be detrimental to wet brake performance. Friction modifiers specific to quiet wet brake noise, may lack the thermal stability required for engine oil performance. Each of these fluids, whether functional, tractor, or lubricating, are designed to meet specific and stringent manufacturer requirements.

The present disclosure provides novel lubricating oil blends formulated for use as automotive crankcase lubricants. Embodiments of the present disclosure may provide lubricating oils suitable for crankcase applications and having improvements in the following characteristics: air entrainment, alcohol fuel compatibility, antioxidancy, anti-wear performance, biofuel compatibility, foam reducing properties, friction reduction, fuel economy, pre-ignition prevention, rust inhibition, sludge and/or soot dispersability, piston cleanliness, deposit formation, and water tolerance.

Engine oils of the present disclosure may be formulated by the addition of one or more additives, as described in detail below, to an appropriate base oil formulation. The additives may be pre-mixed and then combined with a base oil in the form of an additive package (or concentrate) or, alternatively, may be mixed by being combined individually or in any combination with a base oil (or a mixture of both). The fully formulated engine oil may exhibit improved performance properties, based on the additives added and their respective proportions.

Additional details and advantages of the disclosure will be set forth in part in the description which follows, and/or may be learned by practice of the disclosure. The details and advantages of the disclosure may be realized and attained by means of the elements and combinations particularly pointed out in the appended claims. It is to be understood that both the foregoing general description and the following detailed description are exemplary and explanatory only and are not restrictive of the disclosure, as claimed.

BRIEF DESCRIPTION OF THE DRAWING

FIG. 1 shows the High Frequency Reciprocating Rig (HFRR) test results for a lubricating oil composition containing a silicon-containing detergent.

DETAILED DESCRIPTION

Various embodiments of the disclosure provide a lubricating oil composition and methods for reducing low speed pre-ignition events (LSPI) in a boosted internal combustion engine. In particular, boosted internal combustion engines of the present disclosure include turbocharged and supercharged internal combustion engines. The boosted internal combustion engines include spark-ignited, direct injection and/or port-fuel injection engines. The spark-ignited internal combustion engines may be gasoline engines.

In one aspect, the disclosure relates to lubricating oil compositions formulated for reducing the number of low speed pre-ignition events in a turbocharged gasoline direct-injection engine lubricated with the lubricating oil composition. The lubricating oil composition includes: greater than 50 wt. % of a base oil, based on a total weight of the lubricating oil composition, and an additive composition prepared by mixing:
a) an amount of one or more calcium-containing detergent(s) to provide at least 1000 ppmw of calcium to the lubricating oil composition, based on the total weight of the lubricating oil composition, and
b) an amount of one or more silicon-containing compound(s) to provide at least 50 ppmw of silicon to the lubricating oil composition, based on the total weight of the lubricating oil composition, said one or more silicon-containing compound(s) being selected from the group consisting of:
ii) a siloxane according to Formula (I):

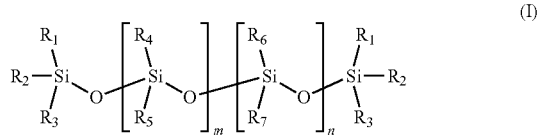

(I)

wherein $R_1$, $R_2$, and $R_3$ are each independently selected from an alkyl group comprising from 1 to 20 carbon atoms, $R_4$ and $R_6$ are each independently selected from an alkyl group comprising from 1 to 20 carbon atoms and an aryl group comprising from 6 to 16 carbon atoms, $R_5$ and $R_7$ are each independently selected from an alkyl group comprising from 1 to 3 carbon atoms, m is an integer from 0 to 50, n is an integer from 0 to 50, wherein m+n<50,
ii) a silane compound according to Formula (II)

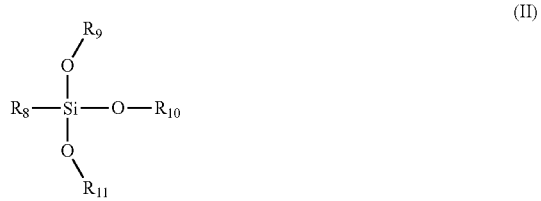

(II)

wherein $R_8$ is an alkyl group comprising from 2 to 20 carbon atoms, and $R_9$, $R_{10}$, and $R_{11}$ are each independently selected from an alkyl group comprising from 1 to 3 carbon atoms; and
c) silica and/or silicon-containing nanoparticles, wherein the nanoparticles have a size of from 1 to 500 nm, as measured by Dynamic Light Scattering;
wherein a ratio of the ppmw of silicon provided by the one or more silicon-containing compound(s) to the lubricating oil composition to the ppmw of calcium provided by the one or more calcium-containing detergent(s) to the lubricating oil composition, is from 0.02 to 1.

The lubricating oil compositions will typically contain mixtures of different siloxane compounds in which case the average values for each of m and n for the mixture need not be an integer but instead each average value of m and n in the mixture can be any number between 0 and 50.

The lubricating oil compositions of the disclosure, including the additive composition, can reduce the number of low speed pre-ignition events in a in a boosted internal combustion engine lubricated with the lubricating oil composition relative to the number of low speed pre-ignition events in the same engine lubricated with a same lubricating oil composition without the one or more silicon-containing compound(s). In addition to reducing the number of low speed pre-ignition events, the lubricating oil compositions disclosed herein are formulated to provide acceptable storage stability and corrosion protection (which can be demonstrated by the Ball Rust Test, according to ASTM D6557, for example).

In alternative embodiments of the lubricating oil composition of the disclosure, one or more other compounds may be used in combination with, or to replace the one or more silicon-containing compound(s). Such alternative embodiments are described in greater detail below.

In another embodiment, the disclosure provides a method for reducing low speed pre-ignition events in a boosted internal combustion engine. The method includes lubricating a boosted internal combustion engine with a lubricating oil composition that includes greater than 50 wt. % of a base oil of lubricating viscosity, an amount of one or more calcium-containing detergent(s) sufficient to provide greater than 1000 ppmw of calcium to the lubricating oil composition, based on a total weight of the lubricating oil composition, and a low speed pre-ignition reducing additive composition comprising an amount of one or more silicon-containing compound(s) as defined above sufficient to provide at least 50 ppmw of silicon to the lubricating oil composition, based on the total weight of the lubricating oil composition. The method is effective to reduce low speed pre-ignition events in a boosted internal combustion engine lubricated with the lubricating oil composition relative to the number of low speed pre-ignition events in the same engine lubricated with a same lubricating oil composition without the one or more silicon-containing compound(s). In addition to reducing the number of low speed pre-ignition events, the methods disclosed herein provide corrosion protection (as demonstrated by the Ball Rust Test, according to ASTM D6557) and acceptable storage stability.

In alternative embodiments of the method of the disclosure, one or more other compounds may be used in combination with, or to replace the one or more silicon-containing compound(s). Such alternative embodiments are described in greater detail below.

In some embodiments, the combustion chamber or cylinder walls of a spark-ignited direct injection engine or port fuel injected internal combustion engine provided with a turbocharger or a supercharger is operated and lubricated with the lubricating oil composition whereby the low-speed pre-ignition events in the engine lubricated with the lubricating oil composition may be reduced.

Optionally, the methods of the present disclosure may include a step of measuring low speed pre-ignition events of the internal combustion engine lubricated with the lubricating oil. In such methods, the internal combustion engine the reduction of LSPI events is a 5% or greater reduction, or, more preferably, a 10% or greater reduction and the LSPI events are LSPI counts during 25,000 engine cycles, wherein the engine is operated at 2000 revolutions per minute with brake mean effective pressure of 18,000 kPa.

In another aspect, the disclosure relates to silicon-containing detergents and methods of making them.

The silicon-containing detergents of the present disclosure are prepared by mixing:
a) one or more calcium-containing detergent(s); and
b) one or more silicon-containing compound(s) selected from the group consisting of:
i) siloxanes according to the Formula (I):

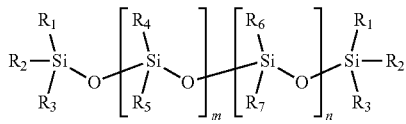

(I)

wherein $R_1$, $R_2$, $R_3$, are each independently selected from an alkyl group comprising from 1 to 20 carbon atoms, $R_4$ and $R_6$ are each independently selected from an alkyl group comprising from 1 to 20 carbon atoms and an aryl group comprising from 6 to 16 carbon atoms, $R_5$ and $R_7$ are each independently selected from an alkyl group comprising from 1 to 3 carbon atoms, m is an integer of from 0 to 50, n is an integer of from 0 to 50, and m+n<50;
ii) silicon-containing compounds according to Formula (III):

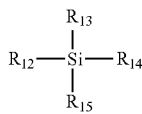

(III)

wherein $R_{12}$, $R_{13}$, $R_{14}$, and $R_{15}$ are each independently selected from an alkyl group comprising from 1 to 20 carbon atoms and an alkoxy group comprising from 1 to 20 carbon atoms; and
iii) silica and/or silicon-containing nanoparticles, wherein the nanoparticles have a size of from 1 to 500 nm, as measured by Dynamic Light Scattering;
wherein a ratio of ppmw of silicon provided by the one or more silicon-containing compound(s) to the silicon-containing detergent to the ppmw of calcium provided by the one or more calcium-containing detergent(s) to the silicon-containing detergent is from 0.02 to 1.

Alternatively, the silicon-containing detergents of the present disclosure are prepared by the reaction of:
a) one or more calcium-containing detergent(s); and
b) one or more silicon-containing compound(s) selected from the group consisting of:
i) siloxanes according to the Formula (I):

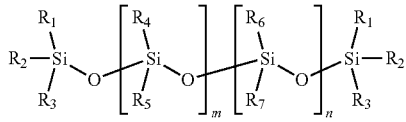

(I)

wherein $R_1$, $R_2$, $R_3$, are each independently selected from an alkyl group comprising from 1 to 20 carbon atoms, $R_4$ and $R_6$ are each independently selected from an alkyl group comprising from 1 to 20 carbon atoms and an aryl group comprising from 6 to 16 carbon atoms, $R_5$ and $R_7$ are each independently selected from an alkyl group comprising from 1 to 3 carbon atoms, m is an integer from 0 to 50, n is an integer from 0 to 50, and m+n<50;
ii) silicon-containing compounds according to Formula (III):

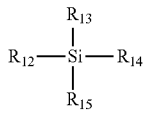

(III)

wherein $R_{12}$, $R_{13}$, $R_{14}$, and $R_{15}$ are each independently selected from an alkyl group comprising from 1 to 20 carbon atoms and an alkoxy group comprising from 1 to 20 carbon atoms; and
iii) silica and/or silicon-containing nanoparticles, wherein the nanoparticles have a size of from 1 to 500 nm, as measured by Dynamic Light Scattering;
wherein a ratio of ppmw of silicon provided by the one or more silicon-containing compound(s) to the silicon-containing detergent to the ppmw of calcium provided by the one or more calcium-containing detergent(s) to the silicon-containing detergent is from 0.02 to 1.

In another embodiment, the present disclosure relates to method of making the silicon-containing detergents including the steps of:
mixing a) and b) to form a mixture, wherein a) and b) are as follows:
a) an amount of one or more calcium-containing detergent(s); and
b) an amount of one or more silicon-containing compound(s) selected from the group consisting of:
i) siloxanes according to the Formula (I):

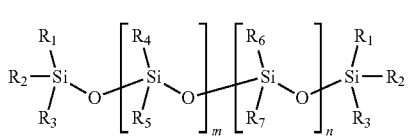

(I)

wherein $R_1$, $R_2$, $R_3$, are each independently selected from an alkyl group comprising from 1 to 20 carbon atoms, $R_4$ and $R_6$ are each independently selected from an alkyl group comprising from 1 to 20 carbon atoms and an aryl group comprising from 6 to 16 carbon atoms, $R_5$ and $R_7$ are each independently selected from an alkyl group comprising from 1 to 3 carbon atoms, m is an integer from 0 to 50, n is an integer from 0 to 50, and m+n<50;
ii) silicon-containing compounds according to Formula (III)

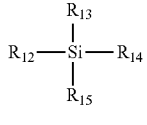

(III)

wherein $R_{12}$, $R_{13}$, $R_{14}$, and $R_{15}$ are each independently selected from an alkyl group comprising from 1 to 20 carbon atoms and an alkoxy group comprising from 1 to 20 carbon atoms; and iii) silica and/or silicon-containing nanoparticles, wherein the nanoparticles have a size of from 1 to 500 nm, as measured by Dynamic Light Scattering;

wherein a ratio of ppmw of silicon provided by the one or more silicon-containing compound(s) to the silicon-containing detergent to the ppmw of calcium provided by the one or more calcium-containing detergent(s) to the silicon-containing detergent is from 0.02 to 1; and heating the mixture to a temperature of from about 30° C. to about 90° C.

In another aspect, the disclosure relates to lubricating oil composition including greater than 50 wt. % of a based oil, based on a total weight of the lubricating oil, and an amount of one or more silicon-containing detergents, present in an amount to provide 50 ppmw of silicon, based on the total weight of the lubricating oil composition.

The Base Oil

The base oil used in the lubricating oil compositions herein may be selected from any of the base oils in Groups I-V as specified in the American Petroleum Institute (API) Base Oil Interchangeability Guidelines. The five base oil groups are as follows:

| Base oil Category | Sulfur (%) | | Saturates (%) | Viscosity Index |
|---|---|---|---|---|
| Group I | >0.03 | and/or | <90 | 80 to 120 |
| Group II | ≤0.03 | and | ≥90 | 80 to 120 |
| Group III | ≤0.03 | and | ≥90 | ≥120 |
| Group IV | All polyalphaolefins (PAOs) | | | |
| Group V | All others not included in Groups 1, II, III, or IV | | | |

Groups I, II, and III are mineral oil process stocks. Group IV base oils contain true synthetic molecular species, which are produced by polymerization of olefinically unsaturated hydrocarbons. Many Group V base oils are also true synthetic products and may include diesters, polyol esters, polyalkylene glycols, alkylated aromatics, polyphosphate esters, polyvinyl ethers, and/or polyphenyl ethers, and the like, but may also be naturally occurring oils, such as vegetable oils. It should be noted that although Group III base oils are derived from mineral oil, the rigorous processing that these fluids undergo causes their physical properties to be very similar to some true synthetics, such as PAOs. Therefore, oils derived from Group III base oils may be referred to as synthetic fluids in the industry. Group II+ may comprise high viscosity index Group II.

The base oil used in the disclosed lubricating oil composition may be a mineral oil, animal oil, vegetable oil, synthetic oil, synthetic oil blends, or mixtures thereof. Suitable oils may be derived from hydrocracking, hydrogenation, hydrofinishing, unrefined, refined, and re-refined oils, and mixtures thereof.

Unrefined oils are those derived from a natural, mineral, or synthetic source without or with little further purification treatment. Refined oils are similar to the unrefined oils except that they have been treated in one or more purification steps, which may result in the improvement of one or more properties. Examples of suitable purification techniques are solvent extraction, secondary distillation, acid or base extraction, filtration, percolation, and the like. Oils refined to the quality of an edible may or may not be useful. Edible oils may also be called white oils. In some embodiments, lubricating oil compositions are free of edible or white oils.

Re-refined oils are also known as reclaimed or reprocessed oils. These oils are obtained similarly to refined oils using the same or similar processes. Often these oils are additionally processed by techniques directed to removal of spent additives and oil breakdown products.

Mineral oils may include oils obtained by drilling or from plants and animals or any mixtures thereof. For example, such oils may include, but are not limited to, castor oil, lard oil, olive oil, peanut oil, corn oil, soybean oil, and linseed oil, as well as mineral lubricating oils, such as liquid petroleum oils and solvent-treated or acid-treated mineral lubricating oils of the paraffinic, naphthenic or mixed paraffinic-naphthenic types. Such oils may be partially or fully hydrogenated, if desired. Oils derived from coal or shale may also be useful.

Useful synthetic lubricating oils may include hydrocarbon oils such as polymerized, oligomerized, or interpolymerized olefins (e.g., polybutylenes, polypropylenes, propyleneisobutylene copolymers); poly(1-hexenes), poly(1-octenes), trimers or oligomers of 1-decene, e.g., poly(1-decenes), such materials being often referred to as α-olefins, and mixtures thereof; alkyl-benzenes (e.g. dodecylbenzenes, tetradecylbenzenes, dinonylbenzenes, di-(2-ethylhexyl)-benzenes); polyphenyls (e.g., biphenyls, terphenyls, alkylated polyphenyls); diphenyl alkanes, alkylated diphenyl alkanes, alkylated diphenyl ethers and alkylated diphenyl sulfides and the derivatives, analogs and homologs thereof or mixtures thereof. Polyalphaolefins are typically hydrogenated materials.

Other synthetic lubricating oils include polyol esters, diesters, liquid esters of phosphorus-containing acids (e.g., tricresyl phosphate, trioctyl phosphate, and the diethyl ester of decane phosphonic acid), or polymeric tetrahydrofurans. Synthetic oils may be produced by Fischer-Tropsch reactions and typically may be hydroisomerized Fischer-Tropsch hydrocarbons or waxes. In one embodiment oils may be prepared by a Fischer-Tropsch gas-to-liquid synthetic procedure as well as other gas-to-liquid oils.

The major amount of base oil included in a lubricating composition may be selected from the group consisting of Group I, Group II, a Group III, a Group IV, a Group V, and a combination of two or more of the foregoing, and wherein the major amount of base oil is other than base oils that arise from provision of additive components or viscosity index improvers in the composition. In another embodiment, the major amount of base oil included in a lubricating composition may be selected from the group consisting of Group II, a Group III, a Group IV, a Group V, and a combination of two or more of the foregoing, and wherein the major amount of base oil is other than base oils that arise from provision of additive components or viscosity index improvers in the composition.

The amount of the oil of lubricating viscosity present may be the balance remaining after subtracting from 100 wt % the sum of the amount of the performance additives inclusive of viscosity index improver(s) and/or pour point depressant(s) and/or other top treat additives. For example, the oil of lubricating viscosity that may be present in a finished fluid may be a major amount, such as greater than about 50 wt %, greater than about 60 wt %, greater than about 70 wt %, greater than about 80 wt %, greater than about 85 wt %, or greater than about 90 wt %.

The Additive Composition

The lubricating oil composition includes an additive composition obtained by mixing at least one or more calcium-containing detergent(s) and one or more silicon-containing compound(s). In some embodiments, one or more of the components of the additive composition may be pre-mixed before addition to the base oil. In some embodiments the components of the additive composition are mixed in the base oil. In other embodiments, some of the components of the additive composition may be pre-mixed and then added to the base oil and other components may be added individually or in combination with each other to the base oil.

Components of the additive composition may be reacted with one another prior to addition to the base oil or after addition to the base oil, including, for example, in use during lubrication of an engine.

The Calcium-Containing Detergent

The additive composition may include an amount of one or more calcium-containing detergent(s) to provide at least 1000 ppmw of calcium to the lubricating oil composition, based on the total weight of the lubricating oil composition.

In some embodiments, the one or more calcium-containing detergents may comprise one or more overbased calcium-containing detergents or one or more low-based calcium-containing detergents, or mixtures thereof. Suitable detergent substrates include phenates, sulfur containing phenates, sulfonates, calixarates, salixarates, salicylates, carboxylic acids, phosphorus acids, mono- and/or di-thiophosphoric acids, alkyl phenols, sulfur coupled alkyl phenol compounds, or methylene bridged phenols. Suitable detergents and their methods of preparation are described in greater detail in numerous patent publications, including U.S. Pat. No. 7,732,390 and references cited therein. A suitable detergent may include alkali or alkaline earth metal salts of petroleum sulfonic acids and long chain mono- or di-alkylarylsulfonic acids with the aryl group being benzyl, tolyl, and xylyl.

Examples of suitable detergents include, but are not limited to, calcium phenates, calcium sulfur-containing phenates, calcium sulfonates, calcium calixarates, calcium salixarates, calcium salicylates, calcium carboxylic acids, calcium phosphorus acids, calcium mono- and/or di-thiophosphoric acids, calcium alkyl phenols, calcium sulfur coupled alkyl phenol compounds, or calcium methylene bridged phenols.

Overbased and low-based detergents are well known in the art and may be alkali or alkaline earth metal overbased detergents. Such detergents may be prepared by reacting a metal oxide or metal hydroxide with a substrate and carbon dioxide gas. The substrate is typically an acid, for example, an acid such as an aliphatic substituted sulfonic acid, an aliphatic substituted carboxylic acid, or an aliphatic substituted phenol.

The terminology "overbased" or "low-based" relates to metal salts, such as metal salts of sulfonates, carboxylates, and phenates, wherein the amount of metal present exceeds the stoichiometric amount. Such salts may have a conversion level in excess of 100% (i.e., they may comprise more than 100% of the theoretical amount of metal needed to convert the acid to its "normal," "neutral" salt). The expression "metal ratio", often abbreviated as MR, is used to designate the ratio of total chemical equivalents of metal in the overbased salt to chemical equivalents of the metal in a neutrals salt according to known chemical reactivity and stoichiometry. In a normal or neutral salt, the metal ratio is 1 and in an overbased salt or low based salt, MR, is greater than 1. They are commonly referred to as overbased, hyberbased, or superbased salts and may be salts of organic sulfur acids, carboxylic acids, or phenols.

The overbased detergent may have a TBN of greater than about 225 mg KOH/gram or greater, or a TBN of about 250 mg KOH/gram or greater, or a TBN of about 300 mg KOH/gram or greater, of a TBN of about 350 mg KOH/gram or greater, or a TBN of about 375 mg KOH/gram or greater, or a TBN of about 400 mg KOH/gram or greater, as measured by the method of ASTM D-2896.

Examples of suitable overbased calcium-containing detergents include, but are not limited to, overbased calcium phenates, overbased calcium sulfur-containing phenates, overbased calcium sulfonates, overbased calcium calixarates, overbased calcium salixarates, overbased calcium salicylates, overbased calcium carboxylic acids, overbased calcium phosphorus acids, overbased calcium mono- and/or di-thiophosphoric acids, overbased calcium alkyl phenols, overbased calcium sulfur coupled alkyl phenol compounds, or overbased calcium methylene bridged phenols. Preferably, the one or more overbased calcium-containing detergent(s) is selected from an overbased calcium sulfonate detergent. Even more preferably, the overbased calcium-containing detergent is an overbased calcium sulfonate detergent. In all embodiments, the lubricating oil composition may be devoid of calcium salicylate detergents and/or the composition may be devoid of phenate-containing detergents.

The overbased calcium-containing detergent may have a metal to substrate ratio of from 1.1:1, or from 2:1, or from 4:1, or from 5:1, or from 7:1, or from 10:1 or from 12:1.

A low-based detergent may have a TBN of up to 175 mg KOH/g, or up to 150 mg KOH/g, as measured by the method of ASTM D-2896. The calcium-containing detergent of the present invention may include a low-based calcium-containing detergent.

Examples of suitable low-based calcium-containing detergents include but are not limited to low-based calcium sulfonates, low-based calcium sulfur-containing phenates, and low-based calcium salicylates. Preferably, the low-based calcium-containing detergent is a calcium sulfonate detergent.

In some embodiments, the calcium-containing detergent is present in an amount sufficient to provide at least 1000 ppmw of calcium, or from 1100 ppmw to 4000 ppmw of calcium, or from about 1200 ppmw to about 3500 ppmw of calcium, or from about 1200 ppmw to about 2400 ppmw of calcium, or from about 1200 ppmw to about 2000 ppmw of calcium, or from about 1800 ppmw to about 2500 ppmw of calcium to the lubricating oil composition, based on the total weight of the lubricating oil composition.

The calcium-containing detergent may be present from about 0.85 wt % to about 10 wt %, or about 1.0 wt % to about 8 wt %, or about 1.0 wt % to about 4.0 wt %, or greater than about 4 wt % to about 8 wt %, based on the total weight of the lubricating oil composition.

In some embodiments, the calcium-containing detergent is present in an amount such that the ratio of the ppmw of silicon provided by the one or more silicon-containing compound(s) to the lubricating oil composition to the ppmw of calcium provided by the one or more calcium-containing detergent(s) to the lubricating oil composition is from 0.02 to 1, or from about 0.025 to 1, or from about 0.033 to 1.

The Silicon-Containing Compounds

The additive composition may include an amount of one or more silicon-containing compound(s) to provide at least 50 ppmw of silicon to the total weight of the lubricating oil composition. The silicon-containing compounds of the present disclosure are oil-soluble.

Suitable silicon-containing compounds employed in preparing the additive composition of the present disclosure including, siloxanes according to the Formula (I), silanes, according to the Formula (II), and silica and/or silicon-containing nanoparticles.

The siloxanes of the present disclosure may be described by the Formula (I):

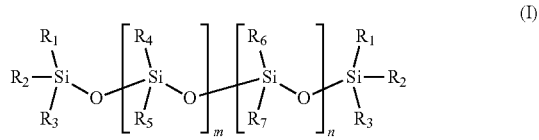

wherein $R_1$, $R_2$, $R_3$, are each independently selected from an alkyl group comprising from 1 to 20 carbon atoms, $R_4$ and $R_6$ are each independently selected from an alkyl group comprising from 1 to 20 carbon atoms and an aryl group comprising from 6 to 16 carbon atoms, $R_5$ and $R_7$ are each independently selected from an alkyl group comprising from 1 to 3 carbon atoms, m is an integer from 0 to 50, n is an integer from 0 to 50, wherein m+n<50.

Optionally, $R_1$, $R_2$, $R_3$, $R_4$, and $R_6$ may be an alkyl group selected from methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octyldecyl, nonadecyl, and eicosyl, and $R_5$ and $R_7$ may be an alkyl group selected from methyl, ethyl, and propyl.

In some embodiments, $R_1$, $R_2$, and $R_3$ are methyl groups, n=1, and m is from 1 to less than 50. In another embodiment, $R_4$ and $R_5$ are methyl groups, n=0, and m is from 1 to less than 50. In another embodiment of the siloxane, $R_1$, $R_2$, $R_3$, $R_4$, and $R_5$, are methyl groups.

In another embodiment, n is from 1 to 23, m is from 1 to 27, $R_1$, $R_2$, $R_3$, $R_4$, $R_5$, and $R_7$ are each independently selected from an alkyl group comprising from 1 to 3 carbon atoms, and $R_6$ is selected from an alkyl group comprising from 1 to 20 carbon atoms.

In another embodiment, $R_4$ and $R_5$ are each independently selected from an alkyl group comprising from 1 to 20 carbon atoms.

In another embodiment, $R_4$ and $R_5$ are each independently selected from an aryl group comprising from 6 to 16 carbon atoms. Optionally, $R_4$ and $R_5$ are aryl groups selected from phenyl, benzyl, naphthyl, tolyl, and xylyl In some embodiments, the siloxanes of the present disclosure have a number average molecular weight of from 100 g/mol to 1,000 g/mol, or from 125 g/mol to 800 g/mol, or from 150 g/mol to 600 g/mol, as determined by gel permeation chromatography (GPC). In some embodiments, n is 0, and m is less than 40, or m is less than 30, or m is less than 20, or m is less than 15, or m is less than 15, or m is less than 10, or m is less than 5.

In some embodiments, n is from 1 to 50, n or from 1 to 30, or n is from 1 to 20, or n is from 1 to 10, and m is from 1 to 50, or m is from 1 to 30, or m is from 1 to 20, or m is from 1 to 10, wherein n+m is less than 50.

In some embodiments, the siloxanes of the present disclosure may have a number average molecular weight of at least 1,000 g/mol, or from 1,000 g/mol to 5,000 g/mol, or from 1,000 g/mol to less than 3,866 g/mol, as determined by GPC.

The siloxanes of the present disclosure preferably have a kinematic viscosity of from 1 cSt to 299 cSt, or from 1 to 50 cSt, or from 1 to 30 cSt, or from 1 to 10 cSt, or from 1 to less than 10 cSt, at 25° C., as measured according to ASTM-445-19.

The siloxanes of the present invention may have one or more of an elemental ratio of hydrogen atoms to silicon atoms of from 6.115 to 9, an elemental ratio of carbon atoms to silicon atoms of from 2.038 to 3, and an elemental ratio of silicon atoms to oxygen atoms of from 1.019 to 2.

Suitable examples of siloxanes employed in the additive composition of the present disclosure may be selected from polydimethylsiloxane, hexadecylmethylsiloxane-dimethylsiloxane copolymer, 3-ethylheptamethyltrisiloxane, octamethyltrisiloxane, decamethyltetrasiloxane, dodecamethylpentasiloxane, and tetradecamethylhexasiloxane.

The silanes of the present disclosure may be described by the Formula (II):

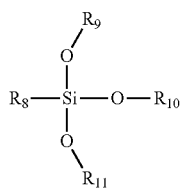

wherein $R_8$ is an alkyl group comprising from 2 to 20 carbon atoms, and $R_9$, $R_{10}$, and $R_{11}$ are each independently selected from an alkyl group comprising from 1 to 3 carbon atoms.

In some embodiments, $R_8$ is an alkyl group comprising from 11 to 18 carbon atoms. In other embodiments, $R_9$, $R_{10}$, and $R_{11}$ are each independently selected from an alkyl group comprising 1 to 3 carbon atoms, or 1 to 2 carbon atoms.

Preferably, the silane compounds of the present disclosure have an average number molecular weight of 100 to 400 g/mol, as determined by GPC. Suitable examples of silane compounds may be selected from hexadecyltrimethoxysilane, octyltriethoxysilane, nonyltriethoxysilane, n-decyltriethoxysilane, undecyltriethoxysilane, and tetradecyltriethoxysilane. Preferably, the silane compounds of the present disclosure are selected from undecyltriethoxysilane, tetradecyltriethoxysilane, and hexadecyltrimethoxysilane.

Optionally, $R_8$ may be an alkyl group selected from ethyl, propyl, butyl, pentyl, hexyl, heptyl, octyl, nonyl, decyl, undecyl, dodecyl, tridecyl, tetradecyl, pentadecyl, hexadecyl, heptadecyl, octyldecyl, nonadecyl, and eicosyl, and $R_9$, $R_{10}$, and $R_{11}$ may be alkyl groups selected from methyl, ethyl, and propyl. Preferably, $R_8$ is an alkyl group selected from undecyl, dodecyl, tridecyl, tetradecyl, pentadecyl, hexadecyl, heptadecyl, octyldecyl.

Alternatively, the silicon-containing compounds may silica and/or silicon containing-nanoparticles, for example, various forms of silica (silicon dioxide) or other particulate silicon-containing compounds. Nanoparticles are defined as compounds having three external dimensions in the range of from 1 to 500 nm, or from 1 to 400 nm, or from 1 to 300 nm or from 1 to 250 nm, as measured by Dynamic Light Scattering in accordance with ASTM E2490-09 (2015). The silica and/or silicon-containing nanoparticles may be solubilized and/or functionalized.

Preferably, the silicon-containing compound is present in an amount sufficient to provide from 50 ppm to about 2000 ppm of silicon, or from about 60 ppm to about 1500 ppm of silicon, or from about 70 ppm to about 1000 ppm of silicon, or from about 150 ppm to about 700 ppm of silicon, or from about 170 ppm to about 550 ppm of silicon, based on the total weight of the lubricating oil composition.

Silicon-Containing Detergents

An alternative embodiment of the present disclosure relates to silicon-containing detergents and methods of making them.

In one embodiment, the silicon-containing detergent is prepared by mixing one or more calcium-containing detergent(s) and one or more silicon-containing compound(s) to form a mixture. The mixture is then heated to a temperature of from about 30° C. to about 90° C., or from about 35° C. to about 80° C., or from about 40° C. to about 70° C., or from about 45° C. to about 65° C. The step of heating may be carried out for a period of from about 30 minutes to 10 hours, or from about 1 hour to 8 hours, or from about 2 hours to about 7 hours. Preferably, the mixture is continuously stirred during the entire process. Suitable stirring speeds may be from about 300 rpm to about 600 rpm, or from about 400 rpm to about 500 rpm, or from about 450 rpm.

In some embodiments, the method comprises a first step of heating the one or more calcium-containing detergent(s) to a temperature of from about 30° C. to about 90° C., or from about 35° C. to about 80° C., or from about 40° C. to about 70° C., or from about 45° C. to about 65° C., prior to the mixing step.

In some embodiments, the method further comprises a step of filtering the mixture after the step of heating the mixture. Preferably, the filtration step employs a pressure filtration system with a 0.22 μm filter.

In an exemplary embodiment of the method, the silicon-containing detergent may be prepared by heating the one or more calcium-containing detergent(s) to a temperature of, for example, at least 45° C., while being stirred at, for example, 450 rpm. The temperature may be measured and controlled using a thermocouple-based control system. Once the temperature of at least 45° C. is achieved, the one or more silicon-containing compound(s) are added. Once the mixture reaches a temperature of at least 45° C., it is stirred for a time period of, for example, 1-5 hours while being maintained at a temperature of at least 45° C. The product is then allowed to cool, optionally with continued stirring. A reaction product is formed that includes at least one calcium- and silicon-containing detergent compound.

In another exemplary embodiment of the method, the silicon-containing detergent may be prepared by mixing one or more silicon-containing compound(s) with one or more calcium detergent(s). The mixture may then be heated to a temperature of at least 65° C., for approximately 7 hours. Subsequently, the mixture was filtered using a pressure filtration system equipped with a 0.22 μm filter.

Suitable calcium-containing detergent(s) employed in making the silicon-containing detergents may include calcium phenates, calcium sulfur containing phenates, calcium sulfonates, calcium calixarates, calcium salixarates, calcium salicylates, calcium carboxylic acids, calcium phosphorus acids, calcium mono- and/or di-thiophosphoric acids, calcium alkyl phenols, calcium sulfur coupled alkyl phenol compounds, calcium methylene bridged phenols including neutral, low-based and overbased versions of all of the foregoing. The overbased calcium-containing detergents have a total base number of at least 225 mg KOH/g, at least 225 mg KOH/g to about 400 mg KOH/g, at least 225 mg KOH/g to about 350 mg KOH/g or about 230 mg KOH/g to about 350 mg KOH/g, all as measured by the method of ASTM D-2896. When such detergent compositions are formed in an inert diluent, e.g. a process oil, usually a mineral oil, the total base number reflects the basicity of the overall composition including diluent, and any other materials (e.g., promoter, etc.) that may be contained in the detergent composition.

Suitable examples of the one or more silicon-containing compound(s) for preparing the silicon-containing detergent include the siloxanes of the Formula (I), the silica and/or silicon-containing nanoparticles disclosed herein, and silicon-containing compounds according to the Formula (III):

(III)

wherein $R_{12}$, $R_{13}$, $R_{14}$, and $R_{15}$ are each independently selected rom an alkyl group comprising from 1 to 20 carbon atoms and an alkoxy group comprising from 1 to 20 carbon atoms.

In some embodiments, the compounds of the Formula (III) are selected from silanes and silicates. In some embodiments, $R_{12}$ is an alkyl group comprising from 11 to 18 carbon atoms. In other embodiments, $R_{13}$, $R_{14}$, and $R_{15}$ are each independently selected from an alkyl group comprising 1 to 3 carbon atoms, or 1 to 2 carbon atoms.

Preferably, the silane compounds of the present disclosure have a number average molecular weight of 100 to 400 g/mol, as determined by GPC. Suitable examples of silane compounds may be selected from hexadecyltrimethoxysilane, octyltriethoxysilane, nonyltriethoxysilane, n-decyltriethoxysilane, undecyltriethoxysilane, and tetradecyltriethoxysilane. Preferably, the silane compounds of the present disclosure are selected from undecyltriethoxysilane, tetradecyltriethoxysilane, and hexadecyltrimethoxysilane Optionally, $R_{12}$ may be an alkyl group selected from ethyl, propyl, butyl, pentyl, hexyl, heptyl, octyl, nonyl, decyl, undecyl, dodecyl, tridecyl, tetradecyl, pentadecyl, hexadecyl, heptadecyl, octyldecyl, nonadecyl, and eicosyl, and $R_9$, $R_{10}$, and $R_{11}$ may be alkyl groups selected from methyl, ethyl, and propyl. Preferably, $R_8$ is an alkyl group selected from undecyl, dodecyl, tridecyl, tetradecyl, pentadecyl, hexadecyl, heptadecyl, octyldecyl.

In some embodiments, $R_{12}$, $R_{13}$, $R_{14}$, and $R_{15}$ are each independently selected from an alkoxy group comprising from 1-10 carbon atoms, or from 1 to 8 carbon atoms, or from 2 to 6 carbon atoms.

Suitable examples of silicate compounds may be selected from tetramethyl silicate, and tetraethyl silicate.

The silicon-containing detergents prepared by the method of the present disclosure preferably contain from about 0.01 wt. % to about 5 wt. % of silicon, or from about 0.1 wt. % to about 4 wt. % of silicon, or from about 0.25 wt. % to about 3 wt. % of silicon, based on the total weight of the silicon-containing detergent.

Preferably, a ratio of ppmw of silicon provided by the one or more silicon-containing compound(s) to the silicon-containing detergent to the ppmw of calcium provided by the one or more calcium-containing detergent(s) to the silicon-containing detergent is from 0.02 to 1.

In some embodiments, the ratio of ppmw of Ca provided by the one or more calcium-containing detergent(s) to the mixture to the ppmw of Si provided by the one or more silicon-containing compound(s) to the mixture is from 10 to 30.

Antioxidants

The lubricating oil compositions herein also may optionally contain one or more antioxidants. Antioxidant compounds are known and include for example, phenates, phenate sulfides, sulfurized olefins, phosphosulfurized terpenes, sulfurized esters, aromatic amines, alkylated diphenylamines (e.g., nonyl diphenylamine, di-nonyl diphenylamine, octyl diphenylamine, di-octyl diphenylamine), phenyl-alpha-naphthylamines, alkylated phenyl-alpha-naphthylamines, hindered non-aromatic amines, phenols, hindered phenols, oil-soluble molybdenum compounds, macromolecular antioxidants, or mixtures thereof. Antioxidant compounds may be used alone or in combination.

The hindered phenol antioxidant may contain a secondary butyl and/or a tertiary butyl group as a sterically hindering group. The phenol group may be further substituted with a hydrocarbyl group and/or a bridging group linking to a second aromatic group. Examples of suitable hindered phenol antioxidants include 2,6-di-tert-butylphenol, 4-methyl-2,6-di-tert-butylphenol, 4-ethyl-2,6-di-tert-butylphenol, 4-propyl-2,6-di-tert-butylphenol or 4-butyl-2,6-di-tert-butylphenol, or 4-dodecyl-2,6-di-tert-butylphenol. In one embodiment the hindered phenol antioxidant may be an ester and may include, e.g., Irganox™ L-135 available from BASF or an addition product derived from 2,6-di-tert-butylphenol and an alkyl acrylate, wherein the alkyl group may contain about 1 to about 18, or about 2 to about 12, or about 2 to about 8, or about 2 to about 6, or about 4 carbon atoms. Another commercially available hindered phenol antioxidant may be an ester and may include Ethanox™ 4716 available from Albemarle Corporation.

Useful antioxidants may include diarylamines and high molecular weight phenols. In an embodiment, the lubricating oil composition may contain a mixture of a diarylamine and a high molecular weight phenol, such that each antioxidant may be present in an amount sufficient to provide up to about 5%, by weight, based upon the final weight of the lubricating oil composition. In an embodiment, the antioxidant may be a mixture of about 0.3 to about 1.5% diarylamine and about 0.4 to about 2.5% high molecular weight phenol, by weight, based upon the final weight of the lubricating oil composition.

Examples of suitable olefins that may be sulfurized to form a sulfurized olefin include propylene, butylene, isobutylene, polyisobutylene, pentene, hexene, heptene, octene, nonene, decene, undecene, dodecene, tridecene, tetradecene, pentadecene, hexadecene, heptadecene, octadecene, nonadecene, eicosene or mixtures thereof. In one embodiment, hexadecene, heptadecene, octadecene, nonadecene, eicosene or mixtures thereof and their dimers, trimers and tetramers are especially useful olefins. Alternatively, the olefin may be a Diels-Alder adduct of a diene such as 1,3-butadiene and an unsaturated ester, such as, butylacrylate.

Another class of sulfurized olefin includes sulfurized fatty acids and their esters. The fatty acids are often obtained from vegetable oil or animal oil and typically contain about 4 to about 22 carbon atoms. Examples of suitable fatty acids and their esters include triglycerides, oleic acid, linoleic acid, palmitoleic acid or mixtures thereof. Often, the fatty acids are obtained from lard oil, tall oil, peanut oil, soybean oil, cottonseed oil, sunflower seed oil or mixtures thereof. Fatty acids and/or ester may be mixed with olefins, such as α-olefins.

In another alternative embodiment the antioxidant composition also contains a molybdenum-containing antioxidant in addition to the phenolic and/or aminic antioxidants discussed above. When a combination of these three antioxidants is used, preferably the ratio of phenolic to aminic to molybdenum-containing is (0 to 2):(0 to 2):(0 to 1).

The one or more antioxidant(s) may be present in ranges about 0 wt % to about 20 wt %, or about 0.1 wt % to about 10 wt %, or about 1 wt % to about 5 wt %, of the lubricating oil composition.

Antiwear Agents

The lubricating oil compositions herein also may optionally contain one or more antiwear agents. Examples of suitable antiwear agents include, but are not limited to, a metal thiophosphate; a metal dialkyldithiophosphate; a phosphoric acid ester or salt thereof; a phosphate ester(s); a phosphite; a phosphorus-containing carboxylic ester, ether, or amide; a sulfurized olefin; thiocarbamate-containing compounds including, thiocarbamate esters, alkylene-coupled thiocarbamates, and bis(S-alkyldithiocarbamyl)disulfides; and mixtures thereof. A suitable antiwear agent may be a molybdenum dithiocarbamate. The phosphorus containing antiwear agents are more fully described in European Patent 612 839. The metal in the dialkyl dithio phosphate salts may be an alkali metal, alkaline earth metal, aluminum, lead, tin, molybdenum, manganese, nickel, copper, titanium, or zinc. A useful antiwear agent may be zinc dialkyldithiophosphate.

Further examples of suitable antiwear agents include titanium compounds, tartrates, tartrimides, oil soluble amine salts of phosphorus compounds, sulfurized olefins, phosphites (such as dibutyl phosphite), phosphonates, thiocarbamate-containing compounds, such as thiocarbamate esters, thiocarbamate amides, thiocarbamic ethers, alkylene-coupled thiocarbamates, and bis(S-alkyldithiocarbamyl) disulfides. The tartrate or tartrimide may contain alkyl-ester groups, where the sum of carbon atoms on the alkyl groups may be at least 8. The antiwear agent may in one embodiment include a citrate.

The antiwear agent may be present in ranges including about 0 wt % to about 15 wt %, or about 0.01 wt % to about 10 wt %, or about 0.05 wt % to about 5 wt %, or about 0.1 wt % to about 3 wt % of the lubricating oil composition.

Boron-Containing Compounds

The lubricating oil compositions herein may optionally contain one or more boron-containing compounds.

Examples of boron-containing compounds include borate esters, borated fatty amines, borated epoxides, borated detergents, and borated dispersants, such as borated succinimide dispersants, as disclosed in U.S. Pat. No. 5,883,057.

The boron-containing compound, if present, can be used in an amount sufficient to provide up to about 8 wt %, about 0.01 wt % to about 7 wt %, about 0.05 wt % to about 5 wt %, or about 0.1 wt % to about 3 wt % of the lubricating oil composition.

Additional Detergents

The lubricating oil composition may optionally further comprise one or more neutral, low based, or overbased detergents, and mixtures thereof. Suitable detergent substrates include phenates, sulfur containing phenates, sulfonates, calixarates, salixarates, salicylates, carboxylic acids, phosphorus acids, mono- and/or di-thiophosphoric acids, alkyl phenols, sulfur coupled alkyl phenol compounds, or methylene bridged phenols. Suitable detergents and their methods of preparation are described in greater detail in numerous patent publications, including U.S. Pat. No. 7,732,390 and references cited therein.

The detergent substrate may be salted with an alkali or alkaline earth metal such as, but not limited to, magnesium, potassium, sodium, lithium, barium, or mixtures thereof. In some embodiments, the detergent is free of barium. In some embodiments, a detergent may contain traces of other metals such as magnesium or calcium in amounts such as 50 ppmw or less, 40 or less, 30 ppmw or less, 20 ppmw or less, or 10 ppmw or less. A suitable detergent may include alkali or alkaline earth metal salts of petroleum sulfonic acids and long chain mono- or di-alkylarylsulfonic acids with the aryl group being benzyl, tolyl, and xylyl. Examples of suitable detergents include, but are not limited to, magnesium phenates, magnesium sulfur containing phenates, magnesium sulfonates, magnesium calixarates, magnesium salixarates, magnesium salicylates, magnesium carboxylic acids, magnesium phosphorus acids, magnesium mono- and/or di-thiophosphoric acids, magnesium alkyl phenols, magnesium sulfur coupled alkyl phenol compounds, magnesium methylene bridged phenols, sodium phenates, sodium sulfur containing phenates, sodium sulfonates, sodium calixarates, sodium salixarates, sodium salicylates, sodium carboxylic acids, sodium phosphorus acids, sodium mono- and/or di-thiophosphoric acids, sodium alkyl phenols, sodium sulfur coupled alkyl phenol compounds, or sodium methylene bridged phenols.

Examples of suitable overbased detergents include, but are not limited to, overbased magnesium phenates, overbased magnesium sulfur containing phenates, overbased magnesium sulfonates, overbased magnesium calixarates, overbased magnesium salixarates, overbased magnesium salicylates, overbased magnesium carboxylic acids, overbased magnesium phosphorus acids, overbased magnesium mono- and/or di-thiophosphoric acids, overbased magnesium alkyl phenols, overbased magnesium sulfur coupled alkyl phenol compounds, or overbased magnesium methylene bridged phenols.

The overbased detergent may have a metal to substrate ratio of from 1.1:1, or from 2:1, or from 4:1, or from 5:1, or from 7:1, or from 10:1.

In some embodiments, a detergent is effective at reducing or preventing rust in an engine.

The additional detergent may be present at about 0 wt % to about 10 wt %, or about 0.1 wt % to about 8 wt %, or about 1 wt % to about 4 wt %, or greater than about 4 wt % to about 8 wt %.

Dispersants

The lubricating oil composition may optionally further comprise one or more dispersants or mixtures thereof. Dispersants are often known as ashless-type dispersants because, prior to mixing in a lubricating oil composition, they do not contain ash-forming metals and they do not normally contribute any ash when added to a lubricant. Ashless type dispersants are characterized by a polar group attached to a relatively high molecular weight hydrocarbon chain. Typical ashless dispersants include N-substituted long chain alkenyl succinimides. Examples of N-substituted long chain alkenyl succinimides include polyisobutylene succinimide with the number average molecular weight of the polyisobutylene substituent being in the range about 350 to about 50,000, or to about 5,000, or to about 3,000, as measured by GPC. Succinimide dispersants and their preparation are disclosed, for instance in U.S. Pat. No. 7,897,696 or 4,234,435. The polyolefin may be prepared from polymerizable monomers containing about 2 to about 16, or about 2 to about 8, or about 2 to about 6 carbon atoms. Succinimide dispersants are typically the imide formed from a polyamine, typically a poly(ethyleneamine).

Preferred amines are selected from polyamines and hydroxyamines. Examples of polyamines that may be used include, but are not limited to, diethylene triamine (DETA), triethylene tetramine (TETA), tetraethylene pentamine (TEPA), and higher homologues such as pentaethylamine hexamine (PEHA), and the like.

A suitable heavy polyamine is a mixture of polyalkylenepolyamines comprising small amounts of lower polyamine oligomers such as TEPA and PEHA (pentaethylene hexamine) but primarily oligomers with 6 or more nitrogen atoms, 2 or more primary amines per molecule, and more extensive branching than conventional polyamine mixtures. A heavy polyamine preferably includes polyamine oligomers containing 7 or more nitrogens per molecule and with 2 or more primary amines per molecule. The heavy polyamine comprises more than 28 wt. % (e.g. >32 wt. %) total nitrogen and an equivalent weight of primary amine groups of 120-160 grams per equivalent.

Suitable polyamines are commonly known as PAM and contain a mixture of ethylene amines where TEPA and pentaethylene hexamine (PEHA) are the major part of the polyamine, usually less than about 80%.

Typically, PAM has 8.7-8.9 milliequivalents of primary amine per gram (an equivalent weight of 115 to 112 grams per equivalent of primary amine) and a total nitrogen content of about 33-34 wt. %. Heavier cuts of PAM oligomers with practically no TEPA and only very small amounts of PEHA but containing primarily oligomers with more than 6 nitrogens and more extensive branching, may produce dispersants with improved dispersancy.

In an embodiment the present disclosure further comprises at least one polyisobutylene succinimide dispersant derived from polyisobutylene with a number average molecular weight in the range about 350 to about 50,000, or to about 5000, or to about 3000, as determined by GPC. The polyisobutylene succinimide may be used alone or in combination with other dispersants.

In some embodiments, polyisobutylene, when included, may have greater than 50 mol %, greater than 60 mol %, greater than 70 mol %, greater than 80 mol %, or greater than 90 mol % content of terminal double bonds. Such PIB is also referred to as highly reactive PIB ("HR-PIB"). HR-PIB having a number average molecular weight ranging from about 800 to about 5000, as determined by GPC, is suitable for use in embodiments of the present disclosure. Conventional PIB typically has less than 50 mol %, less than 40 mol %, less than 30 mol %, less than 20 mol %, or less than 10 mol % content of terminal double bonds.

An HR-PIB having a number average molecular weight ranging from about 900 to about 3000 may be suitable, as determined by GPC. Such HR-PIB is commercially available, or can be synthesized by the polymerization of isobutene in the presence of a non-chlorinated catalyst such as boron trifluoride, as described in U.S. Pat. No. 4,152,499 to Boerzel, et al. and U.S. Pat. No. 5,739,355 to Gateau, et al. When used in the aforementioned thermal ene reaction, HR-PIB may lead to higher conversion rates in the reaction, as well as lower amounts of sediment formation, due to increased reactivity. A suitable method is described in U.S. Pat. No. 7,897,696.

In one embodiment the present disclosure further comprises at least one dispersant derived from polyisobutylene succinic anhydride ("PIBSA"). The PIBSA may have an average of between about 1.0 and about 2.0 succinic acid moieties per polymer.

The % actives of the alkenyl or alkyl succinic anhydride can be determined using a chromatographic technique. This method is described in column 5 and 6 in U.S. Pat. No. 5,334,321.

The percent conversion of the polyolefin is calculated from the % actives using the equation in column 5 and 6 in U.S. Pat. No. 5,334,321.

Unless stated otherwise, all percentages are in weight percent and all molecular weights are number average molecular weights determined by gel permeation chromatography (GPC) using commercially available polystyrene standards (with a number average molecular weight of 180 to about 18,000 as the calibration reference).

In one embodiment, the dispersant may be derived from a polyalphaolefin (PAO) succinic anhydride.

In one embodiment, the dispersant may be derived from olefin maleic anhydride copolymer. As an example, the dispersant may be described as a poly-PIBSA.

In an embodiment, the dispersant may be derived from an anhydride which is grafted to an ethylene-propylene copolymer.

A suitable class of nitrogen-containing dispersants may be derived from olefin copolymers (OCP), more specifically, ethylene-propylene dispersants which may be grafted with maleic anhydride. A more complete list of nitrogen-containing compounds that can be reacted with the functionalized OCP are described in U.S. Pat. Nos. 7,485,603; 7,786,057; 7,253,231; 6,107,257; and 5,075,383; and/or are commercially available.

The hydrocarbyl moiety of the hydrocarbyl-dicarboxylic acid or anhydride of Component A) may alternatively be derived from ethylene-alpha olefin copolymers. These copolymers contain a plurality of ethylene units and a plurality of one or more $C_3$-$C_{10}$ alpha-olefin units. The $C_3$-$C_{10}$ alpha-olefin units may include propylene units.

The ethylene-alpha olefin copolymer typically has a number average molecular weight of less than 5,000 g/mol, as measured by GPC using polystyrene as a calibration reference; or the number average molecular weight of the copolymer may be less than 4,000 g/mol, or less than 3,500 g/mol, or less than 3,000 g/mol, or less than 2,500 g/mol, or less than 2,000 g/mol, or less than 1,500 g/mol, or less than 1,000 g/mol. In some embodiments, the number average molecular weight of the copolymer may be between 800 and 3,000 g/mol.

The ethylene content of the ethylene-alpha olefin copolymer may be less than 80 mol %; less than 70 mol %, or less than 65 mol %, or less than 60 mol %, or less than 55 mol %, or less than 50 mol %, or less than 45 mol %, or less than 40 mol %. The ethylene content of the copolymer may be at least 10 mol % and less than 80 mol %, or at least 20 mol % and less than 70 mol %, or at least 30 mol % and less than 65 mol %, or at least 40 mol % and less than 60 mol %.

The $C_3$-$C_{10}$ alpha-olefin content of the ethylene-alpha olefin copolymer may be at least 20 mol %, or at least 30 mol %, or at least 35 mol %, or at least 40 mol %, or at least 45 mol %, or at least 50 mol %, or at least 55 mol %, or at least 60 mol %.

In some embodiments, at least 70 mol % of molecules of the ethylene-alpha olefin copolymer may have an unsaturated group, and at least 70 mol % of said unsaturated groups may be located in a terminal vinylidene group or a tri-substituted isomer of a terminal vinylidene group or at least 75 mol % of the copolymer terminates in the terminal vinylidene group or the tri-substituted isomer of the terminal vinylidene group, or at least 80 mol % of the copolymer terminates in the terminal vinylidene group or the tri-substituted isomer of the terminal vinylidene group, or at least 80 mol % of the copolymer terminates in the terminal vinylidene group or the tri-substituted isomer of the terminal vinylidene group, or at least 85 mol % of the copolymer terminates in the terminal vinylidene group or the tri-substituted isomer of the terminal vinylidene group, or at least 90 mol % of the copolymer terminates in the terminal vinylidene group or the tri-substituted isomer of the terminal vinylidene group, or at least 95 mol % of the copolymer terminates in the terminal vinylidene group or the tri-substituted isomer of the terminal vinylidene group. the terminal vinylidene and the tri-substituted isomers of the terminal vinylidene of the copolymer have one or more of the following structural formulas (A)-(C):

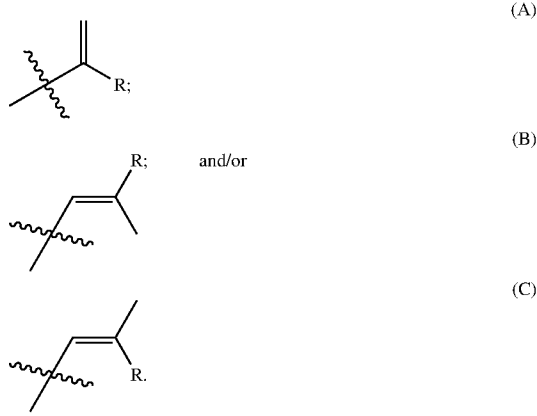

wherein R represents a $C_1$-$C_8$ alkyl group and "⸺" indicates the bond is attached to the remaining portion of the copolymer.

The ethylene-alpha olefin copolymer may have an average ethylene unit run length ($n_{C2}$) which is less than 2.8, as determined by $^{13}$C NMR spectroscopy, and also satisfies the relationship shown by the expression below:

$$n_{C2} < \frac{(EEE + EEA + AEA)}{(AEA + 0.5EEA)}$$

wherein $EEE = (x_{C2})^3$, $EEA = 2(x_{C2})^2(1 - x_{C2})$, $AEA = x_{C2}(1 - x_{C2})^2$, $x_{C2}$ being the mole fraction of ethylene incorporated in the polymer as measured by $^1$H-NMR spectroscopy, E representing an ethylene unit, and A representing an alpha-olefin unit. The copolymer may have an average ethylene unit run length of less than 2.6, or less than 2.4, or less than 2.2, or less than 2. The average ethylene run length $n_{c2}$ may also satisfy the relationship shown by the expression below:

wherein $n_{C2,Actual} < n_{C2,Statistical}$.

The crossover temperature of the ethylene-alpha olefin copolymer may be −20° C. or lower or −25° C. or lower, or −30° C. or lower, or −35° C. or lower, or −40° C. or lower. The copolymer may have a polydispersity index of less than or equal to 4, or less than or equal to 3, or less than or equal to 2. Less than 20% of unit triads in the copolymer may be ethylene-ethylene-ethylene triads, or less than 10% of unit triads in the copolymer are ethylene-ethylene-ethylene triads, or less than 5% of unit triads in the copolymer are ethylene-ethylene-ethylene triads. Further details of the ethylene-alpha olefin copolymers and dispersants made therefrom may be found in PCT/US18/37116 filed at the U.S. Receiving Office, the disclosure of which is hereby incorporated by reference in its entirety.

One class of suitable dispersants may be Mannich bases. Mannich bases are materials that are formed by the condensation of a higher molecular weight, alkyl substituted phenol, a polyalkylene polyamine, and an aldehyde such as formaldehyde. Mannich bases are described in more detail in U.S. Pat. No. 3,634,515.

A suitable class of dispersants may be high molecular weight esters or half ester amides.

A suitable dispersant may also be post-treated by conventional methods by a reaction with any of a variety of agents. Among these are boron, urea, thiourea, dimercaptothiadiazoles, carbon disulfide, aldehydes, ketones, carboxylic acids, hydrocarbon-substituted succinic anhydrides, maleic anhydride, nitriles, epoxides, carbonates, cyclic carbonates, hindered phenolic esters, and phosphorus compounds. U.S. Pat. Nos. 7,645,726; 7,214,649; and 8,048,831 are incorporated herein by reference in their entireties.

In addition to the carbonate and boric acids post-treatments both the compounds may be post-treated, or further post-treatment, with a variety of post-treatments designed to improve or impart different properties. Such post-treatments include those summarized in columns 27-29 of U.S. Pat. No. 5,241,003, hereby incorporated by reference. Such treatments include, treatment with:

Inorganic phosphorous acids or anhydrates (e.g., U.S. Pat. Nos. 3,403,102 and 4,648,980);
Organic phosphorous compounds (e.g., U.S. Pat. No. 3,502,677);
Phosphorous pentasulfides;
Boron compounds as already noted above (e.g., U.S. Pat. Nos. 3,178,663 and 4,652,387); Carboxylic acid, polycarboxylic acids, anhydrides and/or acid halides (e.g., U.S. Pat. Nos. 3,708,522 and 4,948,386);
Epoxides polyepoxiates or thioexpoxides (e.g., U.S. Pat. Nos. 3,859,318 and 5,026,495);
Aldehyde or ketone (e.g., U.S. Pat. No. 3,458,530);
Carbon disulfide (e.g., U.S. Pat. No. 3,256,185);
Glycidol (e.g., U.S. Pat. No. 4,617,137);
Urea, thourea or guanidine (e.g., U.S. Pat. Nos. 3,312,619; 3,865,813; and British Patent GB 1,065,595);
Organic sulfonic acid (e.g., U.S. Pat. No. 3,189,544 and British Patent GB 2,140,811);
Alkenyl cyanide (e.g., U.S. Pat. Nos. 3,278,550 and 3,366,569);
Diketene (e.g., U.S. Pat. No. 3,546,243);
A diisocyanate (e.g., U.S. Pat. No. 3,573,205);
Alkane sultone (e.g., U.S. Pat. No. 3,749,695);
1,3-Dicarbonyl Compound (e.g., U.S. Pat. No. 4,579,675);
Sulfate of alkoxylated alcohol or phenol (e.g., U.S. Pat. No. 3,954,639);
Cyclic lactone (e.g., U.S. Pat. Nos. 4,617,138; 4,645,515; 4,668,246; 4,963,275; and 4,971,711);
Cyclic carbonate or thiocarbonate linear monocarbonate or polycarbonate, or chloroformate (e.g., U.S. Pat. Nos. 4,612,132; 4,647,390; 4,648,886; 4,670,170);
Nitrogen-containing carboxylic acid (e.g., U.S. Pat. No. 4,971,598 and British Patent GB 2,140,811);
Hydroxy-protected chlorodicarbonyloxy compound (e.g., U.S. Pat. No. 4,614,522);
Lactam, thiolactam, thiolactone or dithiolactone (e.g., U.S. Pat. Nos. 4,614,603 and 4,666,460);
Cyclic carbonate or thiocarbonate, linear monocarbonate or polycarbonate, or chloroformate (e.g., U.S. Pat. Nos. 4,612,132; 4,647,390; 4,646,860; and 4,670,170);
Nitrogen-containing carboxylic acid (e.g., U.S. Pat. No. 4,971,598 and British Patent GB 2,440,811);
Hydroxy-protected chlorodicarbonyloxy compound (e.g., U.S. Pat. No. 4,614,522);
Lactam, thiolactam, thiolactone or dithiolactone (e.g., U.S. Pat. Nos. 4,614,603, and 4,666,460);
Cyclic carbamate, cyclic thiocarbamate or cyclic dithiocarbamate (e.g., U.S. Pat. Nos. 4,663,062 and 4,666,459);
Hydroxyaliphatic carboxylic acid (e.g., U.S. Pat. Nos. 4,482,464; 4,521,318; 4,713,189);
Oxidizing agent (e.g., U.S. Pat. No. 4,379,064);
Combination of phosphorus pentasulfide and a polyalkylene polyamine (e.g., U.S. Pat. No. 3,185,647);
Combination of carboxylic acid or an aldehyde or ketone and sulfur or sulfur chloride (e.g., U.S. Pat. Nos. 3,390,086; 3,470,098);
Combination of a hydrazine and carbon disulfide (e.g. U.S. Pat. No. 3,519,564);
Combination of an aldehyde and a phenol (e.g., U.S. Pat. Nos. 3,649,229; 5,030,249; 5,039,307);
Combination of an aldehyde and an O-diester of dithiophosphoric acid (e.g., U.S. Pat. No. 3,865,740);
Combination of a hydroxyaliphatic carboxylic acid and a boric acid (e.g., U.S. Pat. No. 4,554,086);
Combination of a hydroxyaliphatic carboxylic acid, then formaldehyde and a phenol (e.g., U.S. Pat. No. 4,636,322);
Combination of a hydroxyaliphatic carboxylic acid and then an aliphatic dicarboxylic acid (e.g., U.S. Pat. No. 4,663,064);
Combination of formaldehyde and a phenol and then glycolic acid (e.g., U.S. Pat. No. 4,699,724);
Combination of a hydroxyaliphatic carboxylic acid or oxalic acid and then a diisocyanate (e.g. U.S. Pat. No. 4,713,191);
Combination of inorganic acid or anhydride of phosphorus or a partial or total sulfur analog thereof and a boron compound (e.g., U.S. Pat. No. 4,857,214);
Combination of an organic diacid then an unsaturated fatty acid and then a nitrosoaromatic amine optionally followed by a boron compound and then a glycolating agent (e.g., U.S. Pat. No. 4,973,412);
Combination of an aldehyde and a triazole (e.g., U.S. Pat. No. 4,963,278);
Combination of an aldehyde and a triazole then a boron compound (e.g., U.S. Pat. No. 4,981,492);
Combination of cyclic lactone and a boron compound (e.g., U.S. Pat. Nos. 4,963,275 and 4,971,711). The above-mentioned patents are herein incorporated in their entireties.

The TBN of a suitable dispersant may be from about 10 to about 65 mg KOH/g dispersant, on an oil-free basis, which is comparable to about 5 to about 30 TBN if measured on a dispersant sample containing about 50% diluent oil. TBN is measured by the method of ASTM D2896.

The dispersant, if present, can be used in an amount sufficient to provide up to about 20 wt %, based upon the final weight of the lubricating oil composition. Another amount of the dispersant that can be used may be about 0.1 wt % to about 15 wt %, or about 0.1 wt % to about 10 wt %, or about 3 wt % to about 10 wt %, or about 1 wt % to about 6 wt %, or about 7 wt % to about 12 wt %, based upon the final weight of the lubricating oil composition. In some embodiments, the lubricating oil composition utilizes a mixed dispersant system. A single type or a mixture of two or more types of dispersants in any desired ratio may be used.

Friction Modifiers

The lubricating oil compositions herein also may optionally contain one or more friction modifier(s). Suitable friction modifiers may comprise metal containing and metal-free friction modifiers and may include, but are not limited to, imidazolines, amides, amines, succinimides, alkoxylated amines, alkoxylated ether amines, amine oxides, amidoamines, nitriles, betaines, quaternary amines, imines, amine salts, amino guanadine, alkanolamides, phosphonates, metal-containing compounds, glycerol esters, sulfurized fatty compounds and olefins, sunflower oil other naturally occurring plant or animal oils, dicarboxylic acid esters, esters or partial esters of a polyol and one or more aliphatic or aromatic carboxylic acid(s), and the like.

Suitable friction modifiers may contain hydrocarbyl groups that are selected from straight chain, branched chain, or aromatic hydrocarbyl groups or mixtures thereof, and may be saturated or unsaturated. The hydrocarbyl groups may be composed of carbon and hydrogen or hetero atoms such as sulfur or oxygen. The hydrocarbyl groups may range from about 12 to about 25 carbon atoms. In some embodiments the friction modifier may be a long chain fatty acid ester. In another embodiment the long chain fatty acid ester may be a mono-ester, or a di-ester, or a (tri)glyceride. The friction modifier may be a long chain fatty amide, a long chain fatty ester, a long chain fatty epoxide derivatives or a long chain imidazoline.

Other suitable friction modifiers may include organic, ashless (metal-free), nitrogen-free organic friction modifiers. Such friction modifiers may include esters formed by reacting carboxylic acids and anhydrides with alkanols and generally include a polar terminal group (e.g. carboxyl or hydroxyl) covalently bonded to an oleophilic hydrocarbon chain. An example of an organic ashless nitrogen-free friction modifier is known generally as glycerol monooleate (GMO) which may contain mono-, di-, and tri-esters of oleic acid. Other suitable friction modifiers are described in U.S. Pat. No. 6,723,685, herein incorporated by reference in its entirety.

Aminic friction modifiers may include amines or polyamines. Such compounds can have hydrocarbyl groups that are linear, either saturated or unsaturated, or a mixture thereof and may contain from about 12 to about 25 carbon atoms. Further examples of suitable friction modifiers include alkoxylated amines and alkoxylated ether amines. Such compounds may have hydrocarbyl groups that are linear, either saturated, unsaturated, or a mixture thereof. They may contain from about 12 to about 25 carbon atoms. Examples include ethoxylated amines and ethoxylated ether amines.

The amines and amides may be used as such or in the form of an adduct or reaction product with a boron compound such as a boric oxide, boron halide, metaborate, boric acid or a mono-, di- or tri-alkyl borate. Other suitable friction modifiers are described in U.S. Pat. No. 6,300,291, herein incorporated by reference in its entirety.

A friction modifier may optionally be present in ranges such as about 0 wt % to about 10 wt %, or about 0.01 wt % to about 8 wt %, or about 0.1 wt % to about 4 wt %.

Molybdenum-Containing Component

The lubricating oil compositions herein also may optionally contain one or more molybdenum-containing compound(s). An oil-soluble molybdenum compound may have the functional performance of an antiwear agent, an antioxidant, a friction modifier, or mixtures thereof. An oil-soluble molybdenum compound may include molybdenum dithiocarbamates, molybdenum dialkyldithiophosphates, molybdenum dithiophosphinates, amine salts of molybdenum compounds, molybdenum xanthates, molybdenum thioxanthates, molybdenum sulfides, molybdenum carboxylates, molybdenum alkoxides, a trinuclear organo-molybdenum compound, and/or mixtures thereof. The molybdenum sulfides include molybdenum disulfide. The molybdenum disulfide may be in the form of a stable dispersion. In one embodiment the oil-soluble molybdenum compound may be selected from the group consisting of molybdenum dithiocarbamates, molybdenum dialkyldithiophosphates, amine salts of molybdenum compounds, and mixtures thereof. In one embodiment the oil-soluble molybdenum compound may be a molybdenum dithiocarbamate.

Suitable examples of molybdenum compounds which may be used include commercial materials sold under the trade names such as Molyvan 822™, Molyvan™ A, Molyvan 2000™ and Molyvan 855™ from R. T. Vanderbilt Co., Ltd., and Sakura-Lube™ S-165, S-200, S-300, S-310G, S-525, S-600, S-700, and S-710 available from Adeka Corporation, and mixtures thereof. Suitable molybdenum components are described in U.S. Pat. No. 5,650,381; US RE 37,363 E1; US RE 38,929 E1; and US RE 40,595 E1, incorporated herein by reference in their entireties.

Additionally, the molybdenum compound may be an acidic molybdenum compound. Included are molybdic acid, ammonium molybdate, sodium molybdate, potassium molybdate, and other alkaline metal molybdates and other molybdenum salts, e.g., hydrogen sodium molybdate, $MoOCl_4$, $MoO_2Br_2$, $Mo_2O_3Cl_6$, molybdenum trioxide or similar acidic molybdenum compounds. Alternatively, the compositions can be provided with molybdenum by molybdenum/sulfur complexes of basic nitrogen compounds as described, for example, in U.S. Pat. Nos. 4,263,152; 4,285,822; 4,283,295; 4,272,387; 4,265,773; 4,261,843; 4,259,195 and 4,259,194; and WO 94/06897, incorporated herein by reference in their entireties.

Another class of suitable organo-molybdenum compounds are trinuclear molybdenum compounds, such as those of the formula $Mo_3S_kL_nQ_z$ and mixtures thereof, wherein S represents sulfur, L represents independently selected ligands having organo groups with a sufficient number of carbon atoms to render the compound soluble or dispersible in the oil, n is from 1 to 4, k varies from 4 through 7, Q is selected from the group of neutral electron donating compounds such as water, amines, alcohols, phosphines, and ethers, and z ranges from 0 to 5 and includes non-stoichiometric values. At least 21 total carbon atoms may be present among all the ligands' organo groups, such as at least 25, at least 30, or at least 35 carbon atoms. Additional suitable molybdenum compounds are described in U.S. Pat. No. 6,723,685, herein incorporated by reference in its entirety.

The oil-soluble molybdenum compound may be present in an amount sufficient to provide about 0.5 ppmw to about 2000 ppmw, about 1 ppmw to about 700 ppmw, about 1 ppmw to about 550 ppmw, about 5 ppmw to about 300 ppmw, or about 20 ppmw to about 250 ppmw of molybdenum.

Additional Transition Metal-Containing Compounds

In another embodiment, the oil-soluble compound may be an additional transition metal containing compound or a metalloid. The additional transition metals may include, but are not limited to, vanadium, copper, zinc, zirconium, molybdenum, tantalum, tungsten, and the like. Suitable metalloids include, but are not limited to, boron, antimony, tellurium, and the like.

Viscosity Index Improvers

The lubricating oil compositions herein also may optionally contain one or more viscosity index improver(s). Suitable viscosity index improvers may include polyolefins, olefin copolymers, ethylene/propylene copolymers, polyisobutenes, hydrogenated styrene-isoprene polymers, styrene/maleic ester copolymers, hydrogenated styrene/butadiene copolymers, hydrogenated isoprene polymers, alpha-olefin maleic anhydride copolymers, polymethacrylates, polyacrylates, polyalkyl styrenes, hydrogenated alkenyl aryl conjugated diene copolymers, or mixtures thereof. Viscosity index improvers may include star polymers and suitable examples are described in US Publication No. 20120101017A1.

The lubricating oil compositions herein also may optionally contain one or more dispersant viscosity index improver(s) in addition to a viscosity index improver or in lieu of a viscosity index improver. Suitable viscosity index improvers may include functionalized polyolefins, for example, ethylene-propylene copolymers that have been functionalized with the reaction product of an acylating agent (such as maleic anhydride) and an amine; polymethacrylates functionalized with an amine, or esterified maleic anhydride-styrene copolymers reacted with an amine.

The total amount of viscosity index improver and/or dispersant viscosity index improver may be about 0 wt % to about 20 wt %, about 0.1 wt % to about 15 wt %, about 0.1 wt % to about 12 wt %, or about 0.5 wt % to about 10 wt %, of the lubricating oil composition.

Other Optional Additives

Other additives may be selected to perform one or more functions required of a lubricating fluid. Further, one or more of the mentioned additives may be multi-functional and provide functions in addition to or other than the function prescribed herein.

A lubricating oil composition according to the present disclosure may optionally comprise other performance additives. The other performance additives may be in addition to specified additives of the present disclosure and/or may comprise one or more of metal deactivators, viscosity index improvers, detergents, ashless TBN boosters, friction modifiers, antiwear agents, corrosion inhibitors, rust inhibitors, dispersants, dispersant viscosity index improvers, extreme pressure agents, antioxidants, foam inhibitors, demulsifiers, emulsifiers, pour point depressants, seal swelling agents and mixtures thereof. Typically, fully-formulated lubricating oil will contain one or more of these performance additives.

Suitable metal deactivators may include derivatives of benzotriazoles (typically tolyltriazole), dimercaptothiadiazole derivatives, 1,2,4-triazoles, benzimidazoles, 2-alkyldithiobenzimidazoles, or 2-alkyldithiobenzothiazoles; foam inhibitors including copolymers of ethyl acrylate and 2-ethylhexylacrylate and optionally vinyl acetate; demulsifiers including trialkyl phosphates, polyethylene glycols, polyethylene oxides, polypropylene oxides and (ethylene oxide-propylene oxide) polymers; pour point depressants including esters of maleic anhydride-styrene, polymethacrylates, polyacrylates or polyacrylamides.

Suitable foam inhibitors include silicon-based compounds, such as siloxane, polysiloxane, and polydimethylsiloxane.

Suitable pour point depressants may include a polymethylmethacrylates or mixtures thereof. Pour point depressants may be present in an amount sufficient to provide from about 0 wt % to about 1 wt %, about 0.01 wt % to about 0.5 wt %, or about 0.02 wt % to about 0.04 wt % based upon the final weight of the lubricating oil composition.

Suitable rust inhibitors may be a single compound or a mixture of compounds having the property of inhibiting corrosion of ferrous metal surfaces. Non-limiting examples of rust inhibitors useful herein include oil-soluble high molecular weight organic acids, such as 2-ethylhexanoic acid, lauric acid, myristic acid, palmitic acid, oleic acid, linoleic acid, linolenic acid, behenic acid, and cerotic acid, as well as oil-soluble polycarboxylic acids including dimer and trimer acids, such as those produced from tall oil fatty acids, oleic acid, and linoleic acid. Other suitable corrosion inhibitors include long-chain alpha, omega-dicarboxylic acids in the molecular weight range of about 600 to about 3000 and alkenylsuccinic acids in which the alkenyl group contains about 10 or more carbon atoms such as, tetrapropenylsuccinic acid, tetradecenylsuccinic acid, and hexadecenylsuccinic acid. Another useful type of acidic corrosion inhibitors is the half esters of alkenyl succinic acids having about 8 to about 24 carbon atoms in the alkenyl group with alcohols such as the polyglycols. The corresponding half amides of such alkenyl succinic acids are also useful. A useful rust inhibitor is a high molecular weight organic acid. In some embodiments, an engine oil is devoid of a rust inhibitor.

The rust inhibitor, if present, can be used in an amount sufficient to provide about 0 wt % to about 5 wt %, about 0.01 wt % to about 3 wt %, about 0.1 wt % to about 2 wt %, based upon the final weight of the lubricating oil composition.

In general terms, a suitable crankcase lubricant may include additive components in the ranges listed in the following table.

TABLE 2

| Component | Wt. % (Broad) | Wt. % (Typical) |
|---|---|---|
| Silicon-containing compound(s) | 0.009-15.0 | 0.01-9.0 |
| Dispersant(s) | 0.1-20.0 | 1.0-10.0 |
| Metal Detergent(s) | 0.1-15.0 | 0.2-8.0 |
| Antioxidant(s) | 0.1-5.0 | 0.01-3.0 |
| Detergent(s) | 0.1-15.0 | 0.2-8.0 |
| Ashless TBN booster(s) | 0.0-1.0 | 0.01-0.5 |
| Corrosion inhibitor(s) | 0.0-5.0 | 0.0-2.0 |
| Metal dihydrocarbyldithiophosphate(s) | 0.1-6.0 | 0.1-4.0 |
| Ash-free phosphorus compound(s) | 0.0-6.0 | 0.0-4.0 |
| Antifoaming agent(s) | 0.0-5.0 | 0.001-0.15 |
| Antiwear agent(s) | 0.0-1.0 | 0.0-0.8 |
| Pour point depressant(s) | 0.0-5.0 | 0.01-1.5 |
| Viscosity index improver(s) (on a liquid/dilute basis) | 0.0-25.0 | 0.1-15.0 |
| Dispersant viscosity index improver(s) | 0.0-10.0 | 0.0-5.0 |
| Friction modifier(s) | 0.01-5.0 | 0.05-2.0 |
| Base oil(s) | Balance | Balance |
| Total | 100 | 100 |

The percentages of each component above represent the weight percent of each component, based upon the weight of the final lubricating oil composition. The remainder of the lubricating oil composition consists of one or more base oils.

Additives used in formulating the compositions described herein may be blended into the base oil individually or in various sub-combinations. However, it may be suitable to blend all of the components concurrently using an additive concentrate (i.e., additives plus a diluent, such as a hydrocarbon solvent).

EXAMPLES

The following examples are illustrative, but not limiting, of the methods and compositions of the present disclosure.

Other suitable modifications and adaptations of the variety of conditions and parameters normally encountered in the field, and which are obvious to those skilled in the art, are within the spirit and scope of the disclosure. All patents and publications cited herein are fully incorporated by reference herein in their entirety.

To demonstrate how the mixture of a calcium-containing detergent and a silicon-containing compound may affect the properties of the lubricating oil, the lubricating oil compositions were tested for storage stability, corrosion protection, and low speed preignition.

The lubricating oil compositions were tested using the Ball Rust Test to evaluate the ability of a lubricating oil composition to protect against corrosion. The ASTM D6557 test methodology was employed to measure the performance of the oils. Oils with a score of less than 86 were assessed to fail the test.

Stability of a lubricating oil composition is important to ensure desired performance if an engine oil is stored for some duration prior to use in an engine. Several tests are commonly known in the literature for evaluating the stability of lubricating oils, e.g. ASTM D2273, ASTM D7603. The examples provided below were evaluated for stability using a centrifuge-based method employing the apparatus and method as set forth in ASTM D2273. The method used by ASTM D2273 was modified to avoid adding any additional solvent. The method includes pouring the oils into a trace sediment tube and centrifuging for 30 minutes at a speed of 1,700 rpm. Subsequently, the oils were removed from the centrifuge and evaluated visually under a bright light for evidence of sediment. If there is no sediment present, then it is assessed that the oil had acceptable stability.

Low Speed pre-ignition cycles were measured in a General Motors 2.0 L Ecotec turbocharged gasoline direct injection (TGDI) engine. The test was conducted at an engine speed of 2,000 rpm and a brake mean effective pressure (BMEP) of 18 bar. Data was collected for 25,000 cycles per segment, and the test comprised of 6 segments. The engine was double flushed between tests to minimize any effect of carryover. The LSPI cycles were measured by monitoring combustion pressure data and identifying cycles that were outliers either for Peak Pressure or 2% mass fraction burn timing, or both. The average LSPI frequency of the oil was measured by calculating the average of the number of LSPI cycles for the 6 segments. If the average LSPI frequency was 4.5 or above, the oil was assessed to have failed the test.

Each of the lubricating oil compositions contained a major amount of a base oil, a base oil conventional DI package, and the same overbased calcium-sulfonate detergent, with a TBN of 300 mg KOH/g, except where indicated.

Base DI Package Composition

| Component | Wt. % |
| --- | --- |
| Antioxidant(s) | 0.5 to 2.5 |
| Antiwear agent(s), including any metal dihydrocarbyl dithiophosphate | 0.7 to 5.0 |
| Antifoaming agent(s) | 0.001 to 0.01 |
| Detergent(s)* | 0.0 |
| Dispersant(s) | 2.0 to 8.0 |
| Metal-containing friction modifier(s) | 0.01 to 1.25 |
| Metal free friction modifier(s) | 0.01 to 0.5 |
| Pour point depressant(s) | 0.05 to 0.5 |
| Process oil | 0.25 to 1.0 |

*Detergent is varied in the following experiments, so for purposes of the base formulation, the detergent amount is set to zero in the table.

Each of the examples employed different silicon-containing compounds in varying amounts and are specified in the tables and discussion of the examples below. All values listed are stated as weight percent of the component in the lubricating oil composition (i.e., active ingredient plus diluent oil, if any), unless specified otherwise. The inventive examples below demonstrate that the lubricating oil compositions of the present disclosure provide an improvement in LSPI while providing acceptable storage stability and corrosion protection.

TABLE 3

| | CE 1 | CE2 | CE 3 | CE4 | CE 5 | CE6 |
| --- | --- | --- | --- | --- | --- | --- |
| Ca (ppmw) | 1800 | 1300 | 1800 | 1800 | 1800 | 1800 |
| Si (ppmw) | 5 | 5 | 180 | 20 | 100 | 180 |
| Si/Ca ratio* | 0.0028 | 0.0038 | 0.1000 | 0.0111 | 0.0556 | 0.1000 |
| BRT | 124 | 30 | 114 | 120 | 118 | 126 |
| LSPI | 5 | 1.83 | 2.83 | 4.83 | 1.17 | 2.5 |
| Stability | P | P | F | F | F | F |
| Si Type | PDMS-12,500 cSt | PDMS-12,500 cSt | PDMS-12,500 cSt | PDMS-12,500 cSt | Silazane | PDMS-350 cSt |
| n + m (total chain length for polydimethylsiloxanes) | >500 | >500 | >500 | >500 | N/A | ~182 |

"CE" indicates a comparative example.
*ratio of ppmw of silicon provided by the one or more silicon-containing compound(s) to the lubricating oil composition to the ppmw of calcium provided by the one or more overbased calcium-containing detergent(s) to the lubricating oil composition.

Comparative examples CE 1-CE 4 and CE 6 employed typical antifoam polydimethylsiloxanes with chain lengths of greater than 500. CE 1 and CE 2 demonstrated that compositions employing polydimethylsiloxanes with a chain length of greater than 50 carbon atoms in an amount less than 10 ppmw of silicon were capable of providing acceptable stability. However, at higher treat rates of the polydimethylsiloxane with a chain length of greater than 50 carbon atoms, i.e. in CE 3-CE 4 and CE 6, the number of LSPI events increased and the lubricating oil composition did not provide acceptable stability. CE 5 demonstrated that a lubricating oil composition employing a silazane compound was not capable of providing acceptable stability at similar high treat rates of silicon.

TABLE 4

|  | IE 1 | IE 2 | IE 3 | IE 4 | IE 5 | IE 6 |
|---|---|---|---|---|---|---|
| Ca (ppmw) | 1800 | 1800 | 1800 | 1800 | 1800 | 1800 |
| Si (ppmw) | 180 | 180 | 180 | 180 | 180 | 180 |
| Si/Ca ratio* | 0.1000 | 0.1000 | 0.1000 | 0.1000 | 0.1000 | 0.1000 |
| BRT | 118 | 110 | 110 | 92 | 114 | 95 |
| LSPI | 3.67 | 3 | 2.67 | 3.83 | 3.33 | 2.5 |
| Stability | P | P | P | P | P | P |
| Si Type | Hexadecyl trimethoxy silane | PDMS-1.5 cSt | PDMS-50 cSt | $^a$PDMS | $^b$PDMS | Small PDMS molecule with side chain |
| n + m (chain length for polydimethylsiloxanes) | N/A | ~2.4 | ~48.8 | <50 | <50 | 1 |

$^a$PDMS, octyldecyl terminated
$^b$PDMS, with octyl side chain groups
"IE" indicates an example according to the invention.
*ratio of ppmw of silicon provided by the one or more silicon-containing compound(s) to the lubricating oil composition to the ppmw of calcium provided by the one or more overbased calcium-containing detergent(s) to the lubricating oil composition.

Table 4 sets forth data for examples of lubricating oil compositions containing several different silicon-containing compounds according to the present disclosure. In each case, a sufficient amount of silicon-containing compound(s) was employed to contribute 180 ppmw of silicon to the lubricating oil composition. Each of these exemplified lubricating oil formulations demonstrated reduced numbers of LSPI events, corrosion protection, and provided acceptable stability. Inventive formulations IE 3-IE 6, when compared to comparative formulations CE 3 and CE 6 showed that employing a polydimethylsiloxane with a significantly shorter chain length, i.e. less than 50 carbon atoms, provided acceptable stability, passed the corrosion test of ASTM D6557, and reduced the number of LSPI events relative to lubricating oil compositions containing polydimethylsiloxanes with chain lengths in excess of 50 carbon atoms.

TABLE 5

|  | IE 7 | IE 8 | IE 9 | IE 10 | IE 11 |
|---|---|---|---|---|---|
| Ca (ppmw) | 1800 | 1800 | 3000 | 1800 | 1800 |
| Si (ppmw) | 180 | 500 | 180 | 70 | 180 |
| Si/Ca ratio* | 0.1000 | 0.2778 | 0.0599 | 0.0389 | 0.1000 |
| BRT | 129 | 92 | 118 | 95 | 88 |
| LSPI | 3 | 0.83 | 4.33 | 2 | 3.17 |
| Stability | P | P | P | P | P |
| Si Type | Triethoxy (octyl) silane | Hexadecyl Trimethoxy silane | Hexadecyl Trimethoxy silane | Hexadecyl Trimethoxy silane | SiO$_2$ nano-particle |

*ratio of ppmw of silicon provided by the one or more silicon-containing compound(s) to the lubricating oil composition to the ppmw of calcium provided by the one or more overbased calcium-containing detergent(s) to the lubricating oil composition.

Table 5 shows data for examples of lubricating oil compositions containing several different silane compounds as well as silica nanoparticles, according to the present disclosure. Different amounts of silicon were used in some of these examples. IE 7-IE 10 indicate that the best LSPI performance may be achieved at higher treat rates of the silicon-containing compound, and thus at higher Si/Ca weight ratios.

Additional examples were prepared to demonstrate the effects of a silicon-containing detergent on the properties of a lubricating oil.

The baseline lubricating oil composition was used in CE 7. This baseline lubricating oil composition contained a major amount of a base oil, a base oil conventional DI package, a typical antifoam agent, present in an amount to provide about 5 ppm of silicon to the lubricating oil composition, and an overbased calcium containing detergent.

The inventive lubricating oil composition, IE 12 contained a major amount of a base oil, the same base oil conventional DI package, a silicon-containing detergent, and the same antifoam agent employed in CE 7, present in an amount to provide about 5 ppm of silicon to the lubricating oil composition. The silicon-containing detergent employed in IE 12 was prepared by heating the same overbased calcium containing detergent used in CE 7 to a temperature of at least 45° C., while being stirred at 450 rpm. Once the temperature of at least 45° C. was achieved, tetraethyl orthosilicate was added. The mixture was allowed to reach a temperature of at least 45° C. once again and stirred and maintained at this temperature for about 2 hours. The final product was allowed to cool while being stirred.

Table 6 shows the data and LSPI results for the lubricating oils of examples CE 7 and IE 12. CE7 and IE 12 were tested for LSPI performance using the same method discussed above, except that the test comprised of 4 segments, rather than 6 segments.

TABLE 6

|  |  | CE7 |  |  |  | IE 12 |  |  |
|---|---|---|---|---|---|---|---|---|
| Total Ca (ppmw) |  | 2400 |  |  |  | 2400 |  |  |
| Total Si (ppmw) |  | 5 |  |  |  | 95 |  |  |
| Si from a silicon-containing detergent (ppmw) |  | N/A |  |  |  | 90 |  |  |
| Si/Ca ratio* |  | N/A |  |  |  | 0.0375 |  |  |
|  | PP Only | MFB2 Only | Both | Total | PP Only | MFB2 Only | Both | Total |
| Iteration 1 | 0 | 4 | 6 | 10 | 0 | 2 | 2 | 4 |
| Iteration 2 | 0 | 1 | 8 | 9 | 0 | 3 | 2 | 5 |
| Iteration 3 | 0 | 0 | 10 | 10 | 0 | 2 | 0 | 2 |
| Iteration 4 | 0 | 2 | 9 | 11 | 0 | 3 | 8 | 11 |
| Average | 0 | 1.75 | 8.25 | 10 | 0 | 2.5 | 3 | 5.5 |

*ratio of ppmw of silicon provided by the one or more silicon-containing compound(s) to the lubricating oil composition to the ppmw of calcium provided by the one or more overbased calcium-containing detergent(s) to the lubricating oil composition.

As seen from Table 6, the incorporation of a silicon-containing detergent provided a 482 significant improvement in LSPI performance relative to the baseline composition.

The lubricating oils of CE 7 and IE 12 were also tested using the High Frequency Reciprocation Rig (HFRR) test to determine the effects of the silicon-containing detergent on friction. A HFRR from PCS Instruments was used to measure boundary lubrication regime friction coefficients. The test samples were measured by submerging the contact between an SAE 52100 metal ball and an SAE 52100 metal disk in a temperature-controlled bath under a fixed load forwards and backwards at a set stroke frequency. The ability of the lubricant to reduce boundary layer friction is reflected by the determined boundary lubrication regime friction coefficients. A lower value is indicative of lower friction. Table 7 and FIG. 1 show the results from the HFRR test at 70° C.

TABLE 7

| Example | Coefficient of Friction at 70° C. |
|---|---|
| CE7 | 0.132 |
| IE 12 | 0.127 |

As seen from Table 7 and FIG. 1, IE 12 with the silicon-containing detergent provided a lubricating oil composition with a reduced coefficient of friction relative to a composition without the silicon-containing detergent.

Other embodiments of the present disclosure will be apparent to those skilled in the art from consideration of the specification and practice of the embodiments disclosed herein. As used throughout the specification and claims, "a" and/or "an" may refer to one or more than one. Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. It is intended that the specification and examples be considered as exemplary only, with a true scope and spirit of the disclosure being indicated by the following claims.

The foregoing embodiments are susceptible to considerable variation in practice. Accordingly, the embodiments are not intended to be limited to the specific exemplifications set forth hereinabove. Rather, the foregoing embodiments are within the spirit and scope of the appended claims, including the equivalents thereof available as a matter of law.

The patentees do not intend to dedicate any disclosed embodiments to the public, and to the extent any disclosed modifications or alterations may not literally fall within the scope of the claims, they are considered to be part hereof under the doctrine of equivalents.

It is to be understood that each component, compound, substituent or parameter disclosed herein is to be interpreted as being disclosed for use alone or in combination with one or more of each and every other component, compound, substituent or parameter disclosed herein.

It is also to be understood that each amount/value or range of amounts/values for each component, compound, substituent or parameter disclosed herein is to be interpreted as also being disclosed in combination with each amount/value or range of amounts/values disclosed for any other component(s), compounds(s), substituent(s) or parameter(s) disclosed herein and that any combination of amounts/values or ranges of amounts/values for two or more component(s), compounds(s), substituent(s) or parameters disclosed herein are thus also disclosed in combination with each other for the purposes of this description.

It is further understood that each range disclosed herein is to be interpreted as a disclosure of each specific value within the disclosed range that has the same number of significant digits. Thus, a range of from 1-4 is to be interpreted as an express disclosure of the values 1, 2, 3 and 4.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

What is claimed is:

1. A lubricating oil composition formulated for use in a turbocharged gasoline direct-injection engine comprising:

greater than 50 wt. % of a base oil of lubricating viscosity, based on a total weight of the lubricating oil composition, and an additive composition prepared by mixing:

a) an amount of one or more overbased calcium sulfonate detergents to provide at least 1200 ppmw to about 2400 ppmw of calcium to the lubricating oil composition, based on the total weight of the lubricating oil composition, and b) an amount of one or more silicon-containing compound(s) of formula (IA) to provide at least 170 ppmw to about 550 ppmw of silicon to the lubricating oil composition, based on the total weight of the lubricating oil composition:

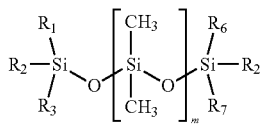

(IA)

wherein $R_1$, $R_2$, $R_3$, are each independently selected from an alkyl group comprising from 1 to 20 carbon atoms, and m is an integer from 1 to less than 50; and wherein a ratio of ppmw of silicon provided by the one or more silicon-containing compound(s) to the lubricating oil composition to the ppmw of calcium provided by the one or more calcium-containing detergent(s) to the lubricating oil composition is at least 0.0389 to 0.1; and the lubricating oil composition is devoid of a calcium salicylate detergent.

2. The lubricating oil composition of claim 1, wherein $R_1$, $R_2$ and $R_3$ are methyl groups.

3. The lubricating oil composition of claim 1, wherein the compound of the Formula (IA) is a polydimethylsiloxane.

4. The lubricating oil composition of claim 1, wherein the compound of Formula (IA) has an elemental ratio of hydrogen atoms to silicon atoms of from 6.115 to 9.

5. The lubricating oil composition of claim 1, wherein the compound of Formula (IA) has an elemental ratio of carbon atoms to silicon atoms of from 2.038 to 3.

6. The lubricating oil composition of claim 1, wherein the lubricating oil composition is effective to reduce the number of low-speed pre-ignition events relative to the number of low-speed pre-ignition events in the same engine lubricated with the same lubricating oil composition absent the additive composition, as determined in a GM 2.0 Liter, 4 cylinder Ecotec turbocharged gasoline direct injection engine operated at an engine speed of 2,000 rpm and a brake mean effective pressure (BMEP) of about 18 bar for 6 segments of 25,000 cycles per segment.

7. A method for reducing low-speed pre-ignition (LSPI) events in a turbocharged gasoline direct-injection engine comprising lubricating the engine with the lubricating oil composition of claim 1, wherein the number of low-speed pre-ignition (LSPI) events is reduced relative to a number of low speed pre-ignition events in the same engine lubricated with the same lubricating oil composition absent the additive composition.

8. A method for providing corrosion protection, comprising lubricating an engine with the lubricating oil composition of claim 1.

9. The lubricating oil composition of claim 1, wherein the overbased calcium sulfonate detergent is present in an amount sufficient to provide from about 1200 ppmw to about 2000 ppmw of calcium, based on the total weight of the lubricating oil composition.

10. The lubricating oil composition of claim 1, wherein the compound of the Formula (I) is a polydimethylsiloxane terminated with an alkyl group comprising from 1 to 18 carbon atoms.

\* \* \* \* \*